(12) United States Patent
Glik et al.

(10) Patent No.: US 10,292,188 B2
(45) Date of Patent: *May 14, 2019

(54) CONNECTION MANAGEMENT TECHNIQUES FOR WIRELESS DOCKING

(71) Applicant: INTEL CORPORATION, Santa Clara, CA (US)

(72) Inventors: Michael Glik, Kfar Saba (IL); Paz Pentelka, Natania (IL); Elad Levy, Nes Ziona (IL); Tal Davidson, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/283,322

(22) Filed: Oct. 1, 2016

(65) Prior Publication Data

US 2017/0105238 A1    Apr. 13, 2017

Related U.S. Application Data

(63) Continuation of application No. 14/497,840, filed on Sep. 26, 2014, now Pat. No. 9,462,617.

(60) Provisional application No. 61/979,285, filed on Apr. 14, 2014.

(51) Int. Cl.
| | | |
|---|---|---|
| *H04B 7/00* | (2006.01) | |
| *H04W 76/11* | (2018.01) | |
| *H04W 12/06* | (2009.01) | |
| *H04W 4/21* | (2018.01) | |
| *H04W 76/10* | (2018.01) | |
| *H04W 4/80* | (2018.01) | |
| *H04L 29/06* | (2006.01) | |

(Continued)

(52) U.S. Cl.
CPC ......... *H04W 76/11* (2018.02); *H04L 63/0823* (2013.01); *H04W 4/023* (2013.01); *H04W 4/21* (2018.02); *H04W 4/80* (2018.02); *H04W 8/005* (2013.01); *H04W 12/06* (2013.01); *H04W 76/10* (2018.02)

(58) Field of Classification Search
None
See application file for complete search history.

(56) References Cited

U.S. PATENT DOCUMENTS 6,931,463 B2 *   8/2005   Striemer ............. H04M 1/7253
                                                                  709/203
8,254,992 B1 *   8/2012   Ashenbrenner ....... G06F 1/1632
                                                                  455/41.2

(Continued)

*Primary Examiner* — Tuan A Tran

(57) ABSTRACT

Disclosed herein are connection management techniques for wireless docking. According to various such techniques, a wireless docking station may be arranged to implement an auto-connect mode setting that defines whether mobile clients are permitted to automatically connect to the wireless docking station, and may be arranged to implement a persistent pairing setting that defines whether authentication certificates may be reused. In some embodiments, the wireless docking station may be configured to advertise the auto-connect mode setting and the persistent pairing setting in auto-connect capability information elements (IEs) that it includes in probe requests and/or probe responses. The embodiments are not limited in this context.

44 Claims, 13 Drawing Sheets

(51) Int. Cl.
  *H04W 8/00*    (2009.01)
  *H04W 4/02*    (2018.01)

(56) References Cited

U.S. PATENT DOCUMENTS

| | | | |
|---|---|---|---|
| 9,036,169 B2* | 5/2015 | Park | G06F 3/1296 |
| | | | 358/1.13 |
| 9,204,301 B2* | 12/2015 | Huang | G06F 1/1632 |
| 9,232,348 B2* | 1/2016 | Huttunen | H04B 7/26 |
| 9,319,981 B2* | 4/2016 | Davidson | H04W 52/0209 |
| 9,445,449 B2* | 9/2016 | Dees | H04W 76/023 |
| 9,479,488 B2* | 10/2016 | Tseng | H04L 63/102 |
| 9,763,030 B2* | 9/2017 | Huttunen | H04B 7/26 |
| 2013/0080676 A1* | 3/2013 | Mifsud | G06F 3/0231 |
| | | | 710/304 |
| 2014/0065956 A1* | 3/2014 | Yang | H04B 5/0012 |
| | | | 455/41.1 |
| 2015/0093990 A1* | 4/2015 | Lin | H04W 4/008 |
| | | | 455/41.2 |
| 2015/0257183 A1* | 9/2015 | Pentelka | H04M 1/7253 |
| | | | 455/41.2 |
| 2016/0337373 A1* | 11/2016 | Tseng | H04L 63/102 |

* cited by examiner

| Element ID 302 | Length 304 | Auto-Connect Capabilities 306 |

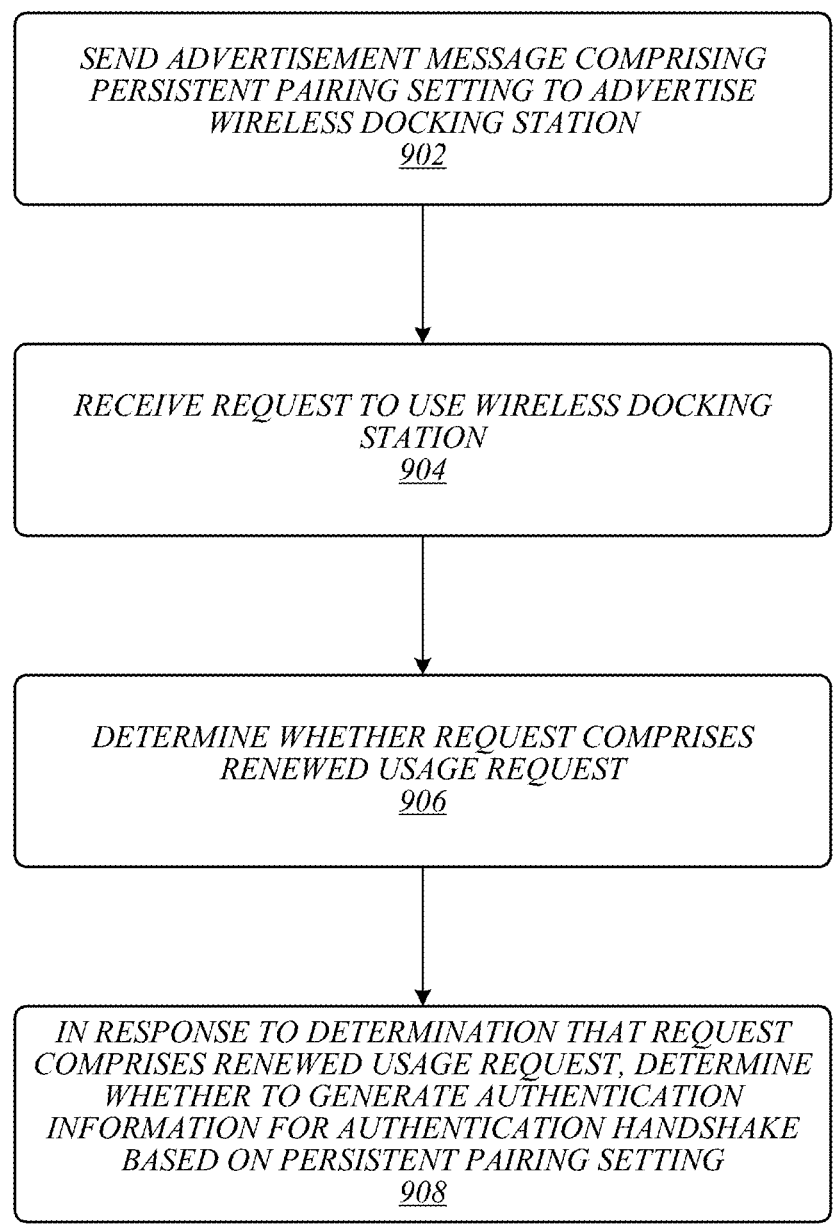

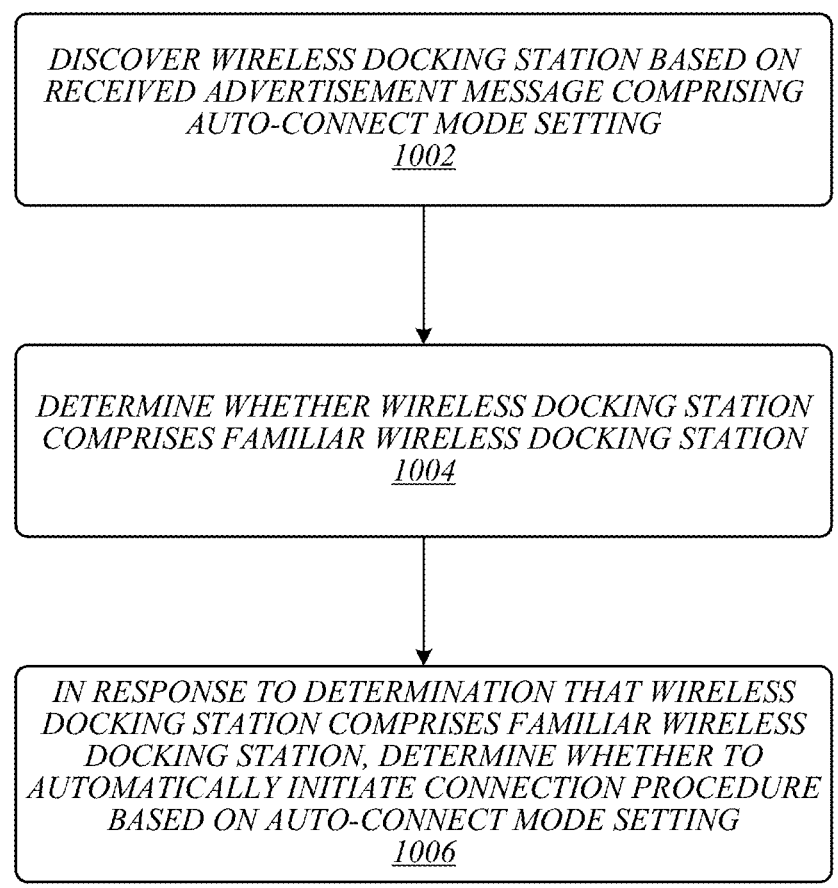

FIG. 11A

Storage Medium 1100

Computer Executable
Instructions for 900

FIG. 11B

Storage Medium 1150

Computer Executable
Instructions for 1000

CONNECTION MANAGEMENT TECHNIQUES FOR WIRELESS DOCKING

CROSS-REFERENCE TO RELATED APPLICATIONS

This application is a continuation of, claims the benefit of and priority to previously filed U.S. patent application Ser. No. 14/497,840 filed Sep. 26, 2014, entitled "CONNECTION MANAGEMENT TECHNIQUES FOR WIRELESS DOCKING", which claims the benefit of U.S. Provisional Patent Application No. 61/979,285 filed Apr. 14, 2014, entitled "CONNECTION MANAGEMENT TECHNIQUES FOR WIRELESS DOCKING". The disclosures of U.S. patent application Ser. No. 14/497,840 and U.S. Provisional Patent Application No. 61/979,285 are hereby incorporated herein by reference in their respective entireties.

TECHNICAL FIELD

Embodiments described herein generally relate to wireless communications between devices in wireless networks.

BACKGROUND

Wireless docking generally involves the establishment of respective wireless connections between a mobile client and one or more peripherals, to enable those peripherals to be used in conjunction with use of the mobile client. The first time a given mobile client discovers a given wireless docking station, the mobile client may prompt its user to indicate whether use of the wireless docking station is desired. If the user indicates that use of the wireless docking station is desired, the mobile client and the wireless docking station may then undergo a pairing process, according to which they generate certificates for use in authenticating one another.

In some cases, it may be desirable that if the mobile client encounters the wireless docking station on a subsequent occasion, it automatically connects to the wireless docking station, without user input and without the need to repeat the pairing process. In some other cases, such as those in which the wireless docking station is publicly shared, it may be desirable for the wireless docking station to prohibit the automatic establishment of wireless docking connections, and/or to require that the pairing process be performed each time such a connection is established. In conventional systems, no mechanism is defined by which wireless docking stations may communicate such requirements to wireless clients.

BRIEF DESCRIPTION OF THE DRAWINGS

FIG. 3 illustrates an embodiment of an information element.

FIG. 9 illustrates an embodiment of a first logic flow.

FIG. 10 illustrates an embodiment of a second logic flow.

FIG. 11A illustrates an embodiment of a first storage medium.

FIG. 11B illustrates an embodiment of a second storage medium.

DETAILED DESCRIPTION

Disclosed herein are connection management techniques for wireless docking. According to various such techniques, a wireless docking station may be arranged to implement an auto-connect mode setting that defines whether mobile clients are permitted to automatically connect to the wireless docking station, and may be arranged to implement a persistent pairing setting that defines whether authentication certificates may be reused. In some embodiments, the wireless docking station may be configured to advertise the auto-connect mode setting and the persistent pairing setting in auto-connect capability information elements (IEs) that it includes in probe requests and/or probe responses. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments are generally directed to wireless communications systems. Some embodiments are particularly directed to wireless communications performed according to one or more wireless communications standards. For example, various embodiments may involve wireless communications performed according to one or more Institute of Electrical and Electronics Engineers (IEEE) 802.11 standards ("Wi-Fi standards"), such as the IEEE 802.11ac-2013 standard, the IEEE 802.11ad-2012 ("WiGig") standard, and/or their revisions, progeny, and/or variants. The embodiments are not limited to these examples.

Figure 1:
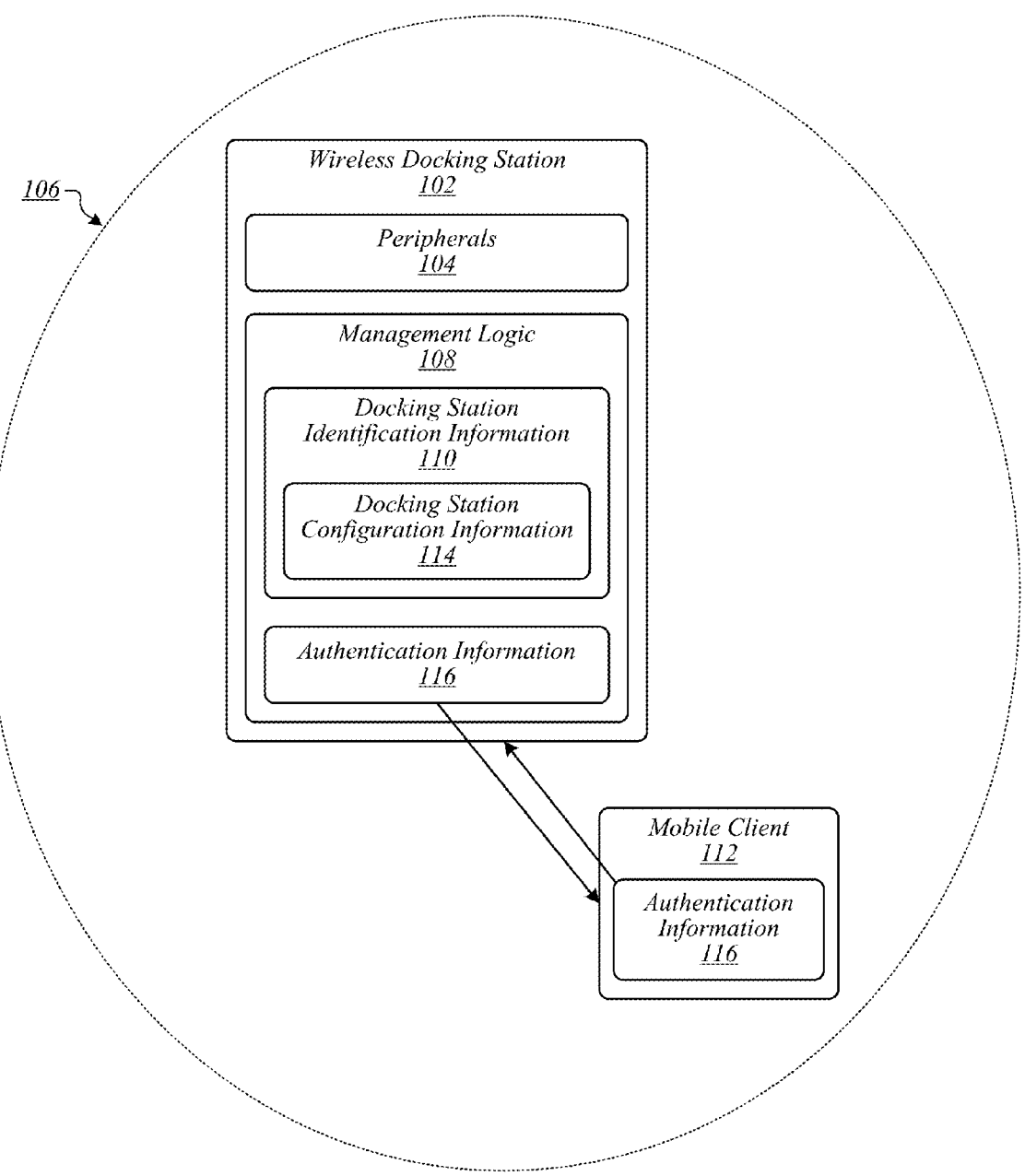
FIG. 1 illustrates an embodiment of an operating environment.

FIG. 1 illustrates an example of an operating environment 100 such as may be representative of various embodiments. In operating environment 100, a wireless docking station 102 offers wireless access to peripherals 104 within a coverage area 106. Management logic 108 at wireless docking station 102 generates docking station identification information 110, which is transmitted within coverage area 106 so that mobile clients may be made aware of wireless docking station 102. When a mobile client 112 enters coverage area 106, it receives docking station identification information 110 and thereby detects wireless docking station 102. In order to notify mobile clients such as mobile client 112 of various capabilities and/or features of wireless docking station 102, management logic 108 may include docking station configuration information 114 in docking station identification information 110. Once it detects wireless docking station 102, mobile client 112 may determine whether to connect to wireless docking station 102. Depending on the circumstances, this determination may be manually performed by a user of mobile client 112 or may be automatically performed by logic comprised in mobile client 112, and may be based on capabilities and/or features identified by docking station configuration information 114. If mobile client 112 elects to connect to wireless docking station 102, it may exchange authentication information 116 with wireless docking station 102 in the course of establishing such a connection. The embodiments are not limited in this context.

Figure 2:
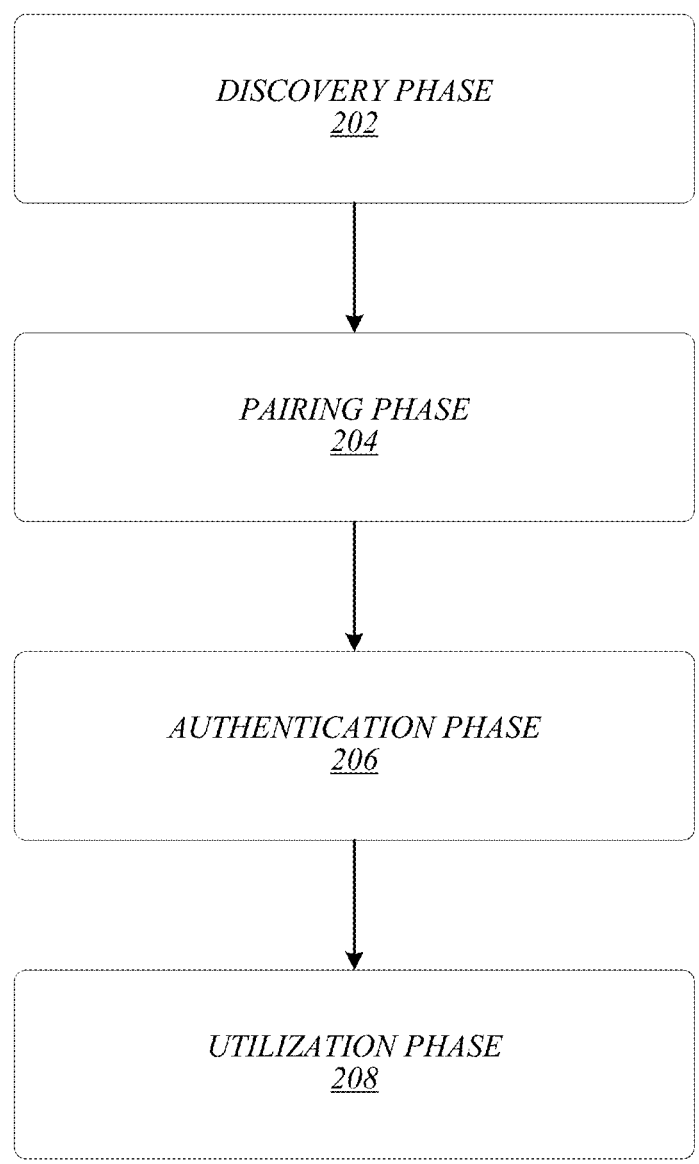
FIG. 2 illustrates an embodiment of an initial connection procedure.

FIG. 2 illustrates an example of an initial connection procedure 200 such as may be representative of a procedure followed by wireless docking station 102 and mobile client 112 on a first occasion upon which mobile client 112 encounters and/or elects to connect with and utilize wireless docking station 102. More particularly, FIG. 2 illustrates various phases that may be comprised within such an initial connection procedure 200. As shown in FIG. 2, initial connection procedure 200 may comprise a discovery phase 202, a pairing phase 204, an authentication phase 206, and a usage phase 208. For purposes of explanation, each of these phases shall be described with reference to example operating environment 100 of FIG. 1. However, it is to be understood that the embodiments are not limited to this example.

During discovery phase 202, mobile client 112 may discover wireless docking station 102 based on received docking station identification information 110, and may prompt a user to specify whether a connection to wireless docking station 102 is desired. In some embodiments, docking station identification information 110 may comprise docking station configuration information 114, and mobile client 112 may present some or all of docking station configuration information 114 in conjunction with prompting the user regarding whether a connection to wireless docking station 102 is desired. For example, if peripherals 104 include a wireless display and docking station configuration information 114 identifies a maximum resolution of that wireless display, mobile client 112 may notify the user of that maximum resolution when it prompts the user for a decision on whether to connect to wireless docking station 102. The embodiments are not limited to this example.

If, during discovery phase 202, the user of mobile client 112 elects to connect to wireless docking station 102, then pairing phase 204 may commence. During pairing phase 204, wireless docking station 102 and mobile client 112 may generate authentication information 116 for subsequent exchange. In various embodiments, authentication information 116 may comprise digital certificates that wireless docking station 102 and mobile client 112 generate for purposes of authentication. In some embodiments, pairing phase 204 may comprise a Wi-Fi Protected Setup (WPS) process. The embodiments are not limited to this example.

Once wireless docking station 102 and mobile client 112 have generated authentication information 116 during pairing phase 204, they may exchange that authentication information 116 during authentication phase 206. In various embodiments, authentication phase 206 may involve a handshake performed using authentication information 116. For example, in some embodiments, authentication phase 206 may involve a 4-way handshake performed according to a Wi-Fi Protected Access II (WPA2) protocol, using digital certificates generated during pairing phase 204. Following successful authentication during authentication phase 206, mobile client 112 may begin actually using wireless docking station 102 during utilization phase 208.

As mentioned above, initial connection procedure 200 may be representative of a procedure followed on a first occasion upon which mobile client 112 encounters and/or elects to connect with and utilize wireless docking station 102. In various embodiments, it may be possible and desirable that on subsequent occasions, mobile client 112 may connect with and utilize wireless docking station 102 without the need to perform all of the operations performed during initial connection procedure 200. For example, in some embodiments, it may be desirable that mobile client 112 be configured to automatically connect to wireless docking station 102 whenever it enters coverage area 106, rather than requiring the user to manually instruct mobile client 112 to establish such a connection. In another example, in various embodiments, it may be desirable that wireless docking station 102 and mobile client 112 retain and reuse authentication information 116 for establishing subsequent connections, rather than repeating pairing phase 204. However, in some other embodiments, such as those in which wireless docking station 102 is publicly shared, it may be desirable that automatic connection to wireless docking station 102 and/or reuse of authentication information 116 be prohibited.

In various embodiments, wireless docking station 102 may be arranged to implement one or more configurable auto-connect settings, which may define whether any portions of initial connection procedure 200 may be skipped on subsequent occasions. In some embodiments, wireless docking station 102 may be arranged to implement an auto-connect mode setting that defines whether mobile clients such as mobile client 112 are permitted to automatically connect to wireless docking station 102. In various embodiments, wireless docking station 102 may be arranged to implement a persistent pairing setting that defines whether authentication information 116 can be reused or must instead be freshly generated each time a connection to wireless docking station 102 is established. The embodiments are not limited to these examples.

In some embodiments, in order to inform mobile clients that enter coverage area 106 of its auto-connect settings, wireless docking station 102 may be operative to include information describing its auto-connect settings within docking station configuration information 114 and/or docking station identification information 110. In various embodiments, wireless docking station 102 may be operative to communicate its auto-connect settings using a defined information element (IE). In some embodiments, management logic 108 may be operative to advertise docking station identification information 110 via probe requests and/or probe responses, and may be operative to include auto-connect capability IEs in those probe requests and/or probe responses in order to inform mobile clients of auto-connect settings for wireless docking station 102. The embodiments are not limited in this context.

FIG. 3 illustrates an example information element 300 such as may be representative of various embodiments. For example, information element 300 may be representative of an auto-connect capability IE that wireless docking station 102 of FIG. 1 may include in probe request and/or probe response messages in order to inform mobile clients of its auto-connect settings. As shown in FIG. 3, information element 300 comprises an element identifier (ID) field 302, a length field 304, and an auto-connect capabilities field 306. In some embodiments, element ID field 302 may comprise a value indicating that information element 300 comprises an auto-connect capability IE. In various embodiments, length field 304 may comprise a value indicating a length of auto-connect capabilities field 306. In some embodiments, auto-connect capabilities field 306 may comprise information identifying one or more auto-connect settings for a wireless docking station, such as wireless docking station 102 of FIG. 1. The embodiments are not limited to this example.

In various embodiments, one or more possible values may be defined for auto-connect capabilities field 306, each of which may correspond to a respective set of one or more auto-connect settings. For example, a first defined value may correspond to a setting according to which all connections to the wireless docking station must be manually user-requested, but authentication certificates may be saved and reused, and thus repeat pairing is not required. A second defined value may correspond to a setting according to which all connections to the wireless docking station must be manually user-requested, and authentication certificates must be discarded following the establishment of each respective connection. A third defined value may correspond to a setting according to which both automatic connection and certificate reuse are permitted. The embodiments are not limited to these examples.

Figure 4:
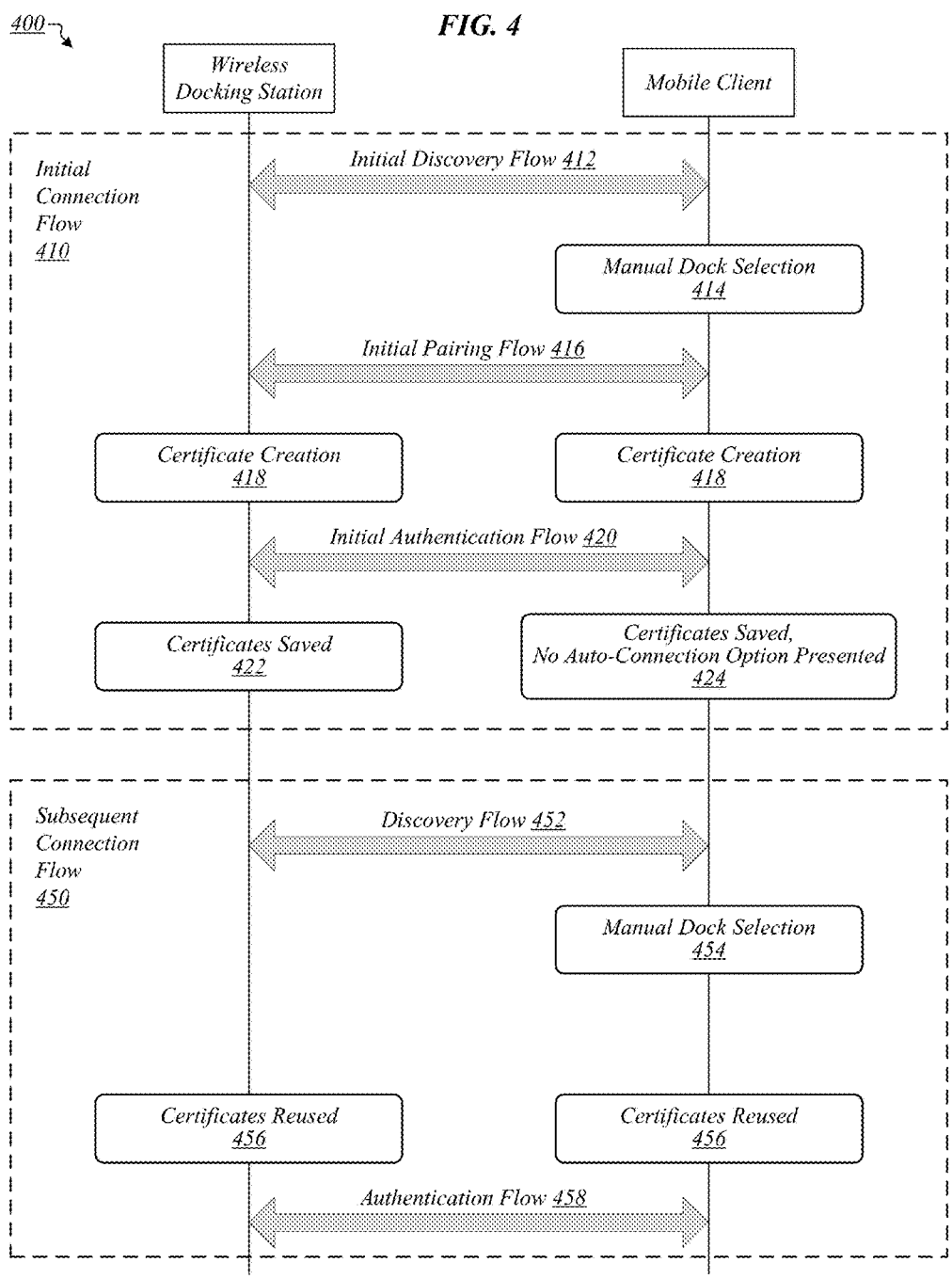
FIG. 4 illustrates an embodiment of a first communications flow.

FIG. 4 illustrates an example of a communications flow 400 such as may be representative of some embodiments. More particularly, communications flow 400 may be representative of various embodiments in which all connections to a wireless dock must be manually user-requested, but authentication certificates may be saved and reused. As shown in FIG. 4, communications flow 400 involves an exchange of communications between a wireless docking station, such as wireless docking station 102 of FIG. 1, and a mobile client, such as mobile client 112 of FIG. 1. Communications flow 400 comprises an initial connection flow 410 and a subsequent connection flow 450. Initial connection flow 410 depicts communications that may be exchanged on a first occasion upon which the mobile client connects with the wireless docking station, while subsequent connection flow 450 depicts communications that may be exchanged on a subsequent occasion upon which the mobile client connects with the wireless docking station.

Initial connection flow 410 begins with initial discovery flow 412, during which the wireless docking station may advertise its presence, features, and/or capabilities to devices within range. As part of this process, the wireless docking station may advertise its auto-connect settings by sending one or more auto-connect capability IEs. In some embodiments, the wireless docking station may advertise its presence, features, and/or capabilities by sending probe requests and/or probe responses. In various such embodiments, the wireless docking station may include auto-connect capability IEs in those probe requests and/or probe responses. In the example of FIG. 4, the auto-connect capability IEs may indicate that authentication certificates may be reused, but that automatic connections to the wireless docking station are not permitted. At 414, in response to a prompt presented based on advertisements received from the wireless docking station, a user of the mobile client may manually select the wireless docking station for use.

Following this manual selection, an initial pairing flow 416 may occur, during which the wireless docking station and the mobile client may begin a process for generating authentication certificates for exchange. In some embodiments, initial pairing flow 416 may comprise a communications exchange performed according to a WPS protocol. The process begun via initial pairing flow 416 may result in authentication certificate creation at 418, at both the wireless docking station and the mobile client. The certificates created at 418 may be used in an initial authentication flow 420, via which the wireless docking station and the mobile client may authenticate each other. In various embodiments, initial authentication flow 420 may comprise a communications exchange performed according to a WPA2 protocol. For example, in some embodiments, initial authentication flow 420 may involve the use of the authentication certificates in a WPA2 4-way handshake.

Following initial authentication flow 420, at 422, the wireless docking station may save the certificates created at 418, in order to reuse them during subsequent connection procedures. Similarly, at 424, the mobile client may save the certificates created at 418. However, based on one or more received auto-connect capability IEs indicating that automatic connections to the wireless docking station are not permitted, the mobile client may not present its user with the option of creating an auto-connect profile for the wireless docking station. At this point, the mobile client may utilize the wireless docking station for some time interval, following which it may disconnect from the wireless docking station and exit its coverage area.

Subsequent connection flow 450 may be triggered at a later point in time, upon reentry of the mobile client into the coverage area of the wireless docking station. Subsequent connection flow 450 may begin with discovery flow 452, during which the mobile client may receive an advertisement from the wireless docking station and identify it as the wireless docking station that it previously used during initial connection flow 410. Because automatic connections to the wireless docking station are not permitted, and the option of creating an auto-connect profile was therefore not presented to the user at 424, use of the wireless docking station may once again require a manual selection on the part of the user, which may occur at 454. Because authentication certificate reuse is permitted, a pairing process may be skipped, and the certificates may be reused at 456. In an authentication flow 458, the wireless docking station and the mobile client may authenticate each other using the same certificates as those used in initial authentication flow 420. The embodiments are not limited in this context.

Figure 5:
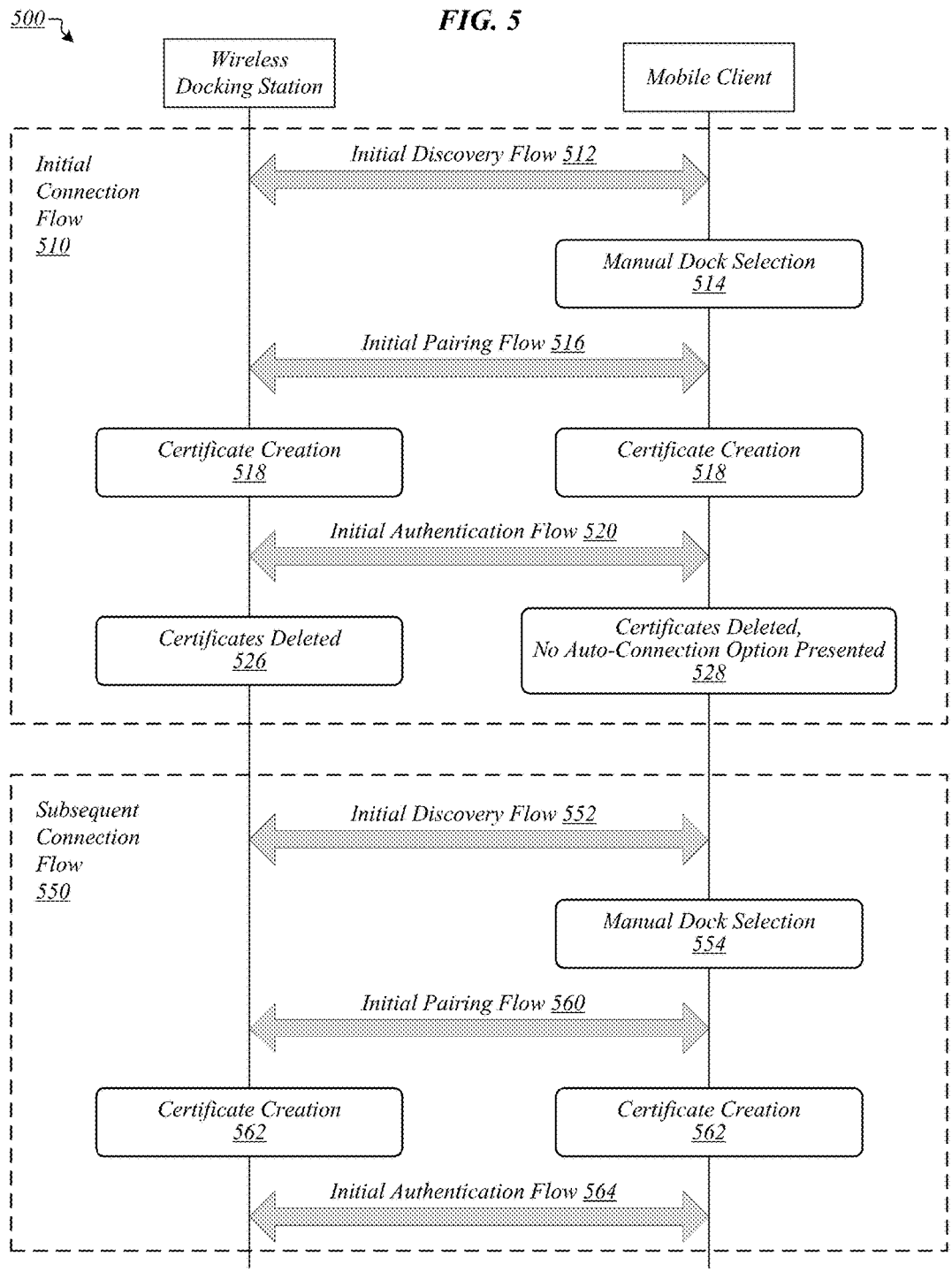
FIG. 5 illustrates an embodiment of a second communications flow.

FIG. 5 illustrates an example of a communications flow 500 such as may be representative of various embodiments. More particularly, communications flow 500 may be representative of some embodiments in which all connections to a wireless dock must be manually user-requested, and authentication certificates may not be reused. Like communications flow 400 of FIG. 4, communications flow 500 involves an exchange of communications between a wireless docking station, such as wireless docking station 102 of FIG. 1, and a mobile client, such as mobile client 112 of FIG. 1. Communications flow 500 comprises an initial connection flow 510 and a subsequent connection flow 550. Initial connection flow 510 depicts communications that may be exchanged on a first occasion upon which the mobile client connects with the wireless docking station, while subsequent connection flow 550 depicts communications that may be exchanged on a subsequent occasion upon which the mobile client connects with the wireless docking station.

Initial connection flow 510 begins with initial discovery flow 512, during which the wireless docking station may advertise its presence, features, and/or capabilities to devices within range. As part of this process, the wireless docking station may advertise its auto-connect settings by sending one or more auto-connect capability IEs. In various embodiments, the wireless docking station may advertise its presence, features, and/or capabilities by sending probe requests and/or probe responses. In some such embodiments, the wireless docking station may include auto-connect capability IEs in those probe requests and/or probe responses. In the example of FIG. 5, the auto-connect capability IEs may indicate that automatic connections to the wireless docking station are not permitted and that authentication certificates may not be reused. At 514, in response to a prompt presented based on advertisements received from the wireless docking station, a user of the mobile client may manually select the wireless docking station for use.

The manual dock selection at 514 may be followed by an initial pairing flow 516, certificate creation 518, and initial authentication flow 520 that are the same as or similar to initial pairing flow 416, certificate creation 418, and initial authentication flow 420 of FIG. 4. Following initial authentication flow 520, because authentication certificate reuse is not permitted, the wireless docking station may delete at 526 the certificates created at 518. Similarly, based on one or more received auto-connect capability IEs indicating that certificate reuse is not permitted, the mobile client may delete those certificates at 528. Furthermore, the received auto-connect IE(s) may indicate that automatic connections to the wireless docking station are not permitted, and the mobile client may therefore not present its user with the option of creating an auto-connect profile for the wireless docking station at 528. At this point, the mobile client may utilize the wireless docking station for some time interval, following which it may disconnect from the wireless docking station and exit its coverage area.

Subsequent connection flow 550 may be triggered at a later point in time, upon reentry of the mobile client into the coverage area of the wireless docking station. Because automatic connections to the wireless docking station are not permitted, and authentication certificate reuse is also not permitted, the operations comprised in subsequent connection flow 550 may essentially be the same as those involved in initial connection flow 510. Namely, subsequent connection flow 550 may comprise an initial discovery flow 552 that is the same as or similar to initial discovery flow 512, a manual dock selection at 554 that is the same as or similar to the manual dock selection at 514, an initial pairing flow 560 that is the same as or similar to initial pairing flow 516, certificate creation at 562 that is the same as or similar to the certificate creation at 518, and an initial authentication flow 564 that is the same as or similar to initial authentication flow 520.

It is worthy of note that initial authentication flow 564 may be the same as or similar to initial authentication flow 520 in the sense that both authentication flows may utilize respective sets of freshly created certificates, which may differ from one another. In contrast, authentication flow 458 of FIG. 4 may differ from initial authentication flow 420 in the sense that while initial authentication flow 420 may utilize freshly created certificates, authentication flow 458 may reuse previously utilized certificates, which may be the same as those utilized by initial authentication flow 420. The embodiments are not limited in this context.

Figure 6:
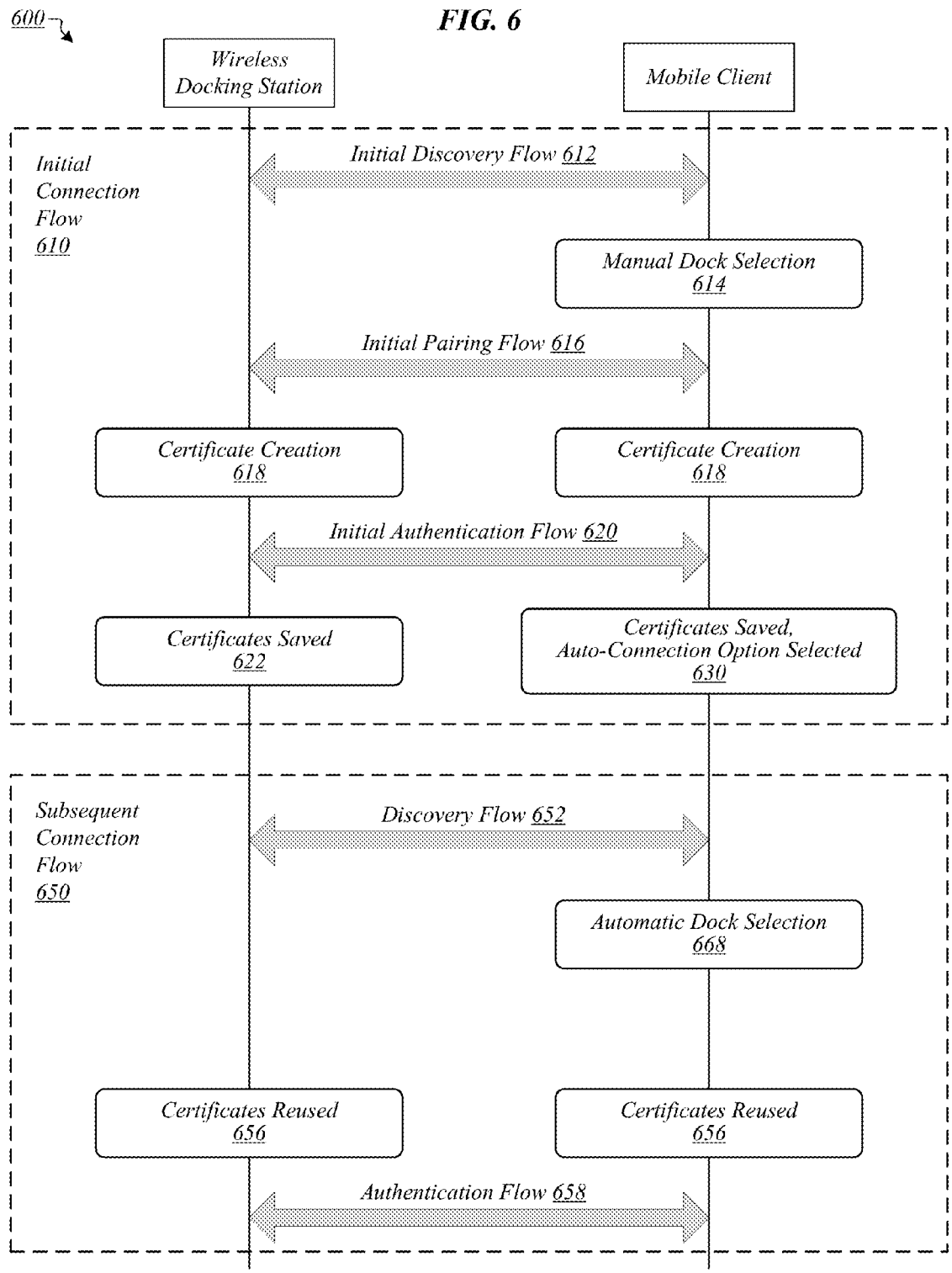
FIG. 6 illustrates an embodiment of a third communications flow.

FIG. 6 illustrates an example of a communications flow 600 such as may be representative of various embodiments. More particularly, communications flow 600 may be representative of some embodiments in which automatic connections to a wireless docking station are permitted, and authentication certificate reuse is also permitted. Like communications flow 400 of FIG. 4 and communications flow 500 of FIG. 5, communications flow 600 involves an exchange of communications between a wireless docking station, such as wireless docking station 102 of FIG. 1, and a mobile client, such as mobile client 112 of FIG. 1. Communications flow 600 comprises an initial connection flow 610 and a subsequent connection flow 650. Initial connection flow 610 depicts communications that may be exchanged on a first occasion upon which the mobile client connects with the wireless docking station, while subsequent connection flow 650 depicts communications that may be exchanged on a subsequent occasion upon which the mobile client connects with the wireless docking station.

Initial connection flow 610 begins with initial discovery flow 612, during which the wireless docking station may advertise its presence, features, and/or capabilities to devices within range. As part of this process, the wireless docking station may advertise its auto-connect settings by sending one or more auto-connect capability IEs. In various embodiments, the wireless docking station may advertise its presence, features, and/or capabilities by sending probe requests and/or probe responses. In some such embodiments, the wireless docking station may include auto-connect capability IEs in those probe requests and/or probe responses. In the example of FIG. 6, the auto-connect capability IEs may indicate that automatic connections to the wireless docking station are permitted and that authentication certificates may be reused. At 614, in response to a prompt presented based on advertisements received from the wireless docking station, a user of the mobile client may manually select the wireless docking station for use.

The manual dock selection at 614 may be followed by an initial pairing flow 616, certificate creation 618, and initial authentication flow 620 that are the same as or similar to initial pairing flow 416 of FIG. 4 and/or initial pairing flow 516 of FIG. 5, certificate creation at 418 in FIG. 4 and/or certificate creation at 518 in FIG. 5, and initial authentication flow 420 of FIG. 4 and/or initial authentication flow 520 of FIG. 5. Following initial authentication flow 620, because authentication certificate reuse is permitted, the wireless docking station may save at 622 the certificates created at 618. Similarly, based on one or more received auto-connect capability IEs indicating that certificate reuse is permitted, the mobile client may save those certificates at 630. Furthermore, the received auto-connect IE(s) may indicate that automatic connections to the wireless docking station are permitted, and the mobile client may therefore present its user with the option of creating an auto-connect profile for the wireless docking station at 630. At this point, the mobile client may utilize the wireless docking station for some time interval, following which it may disconnect from the wireless docking station and exit its coverage area.

Subsequent connection flow 650 may be triggered at a later point in time, upon reentry of the mobile client into the coverage area of the wireless docking station. Because automatic connections to the wireless docking station are permitted, the mobile client may automatically select the wireless docking station for connection at 668, based on an auto-connect profile generated at 630. Because authentication certificate reuse is permitted, a pairing process may be skipped, and the certificates created at 618 may be reused at 656. In an authentication flow 658, the wireless docking station and the mobile client may authenticate each other using the same certificates as those used in initial authentication flow 620. The embodiments are not limited in this context.

Figure 7:
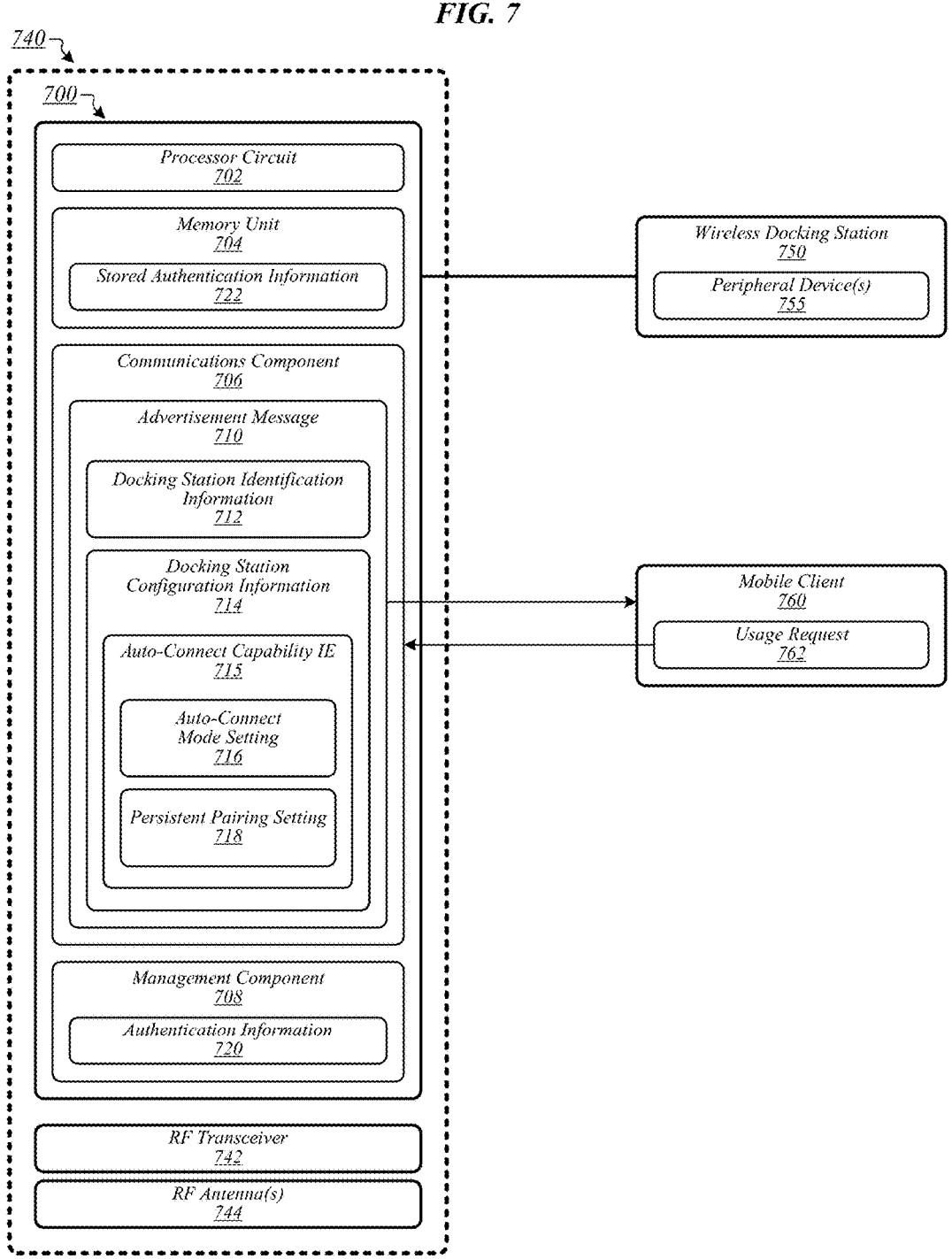
FIG. 7 illustrates an embodiment of a first apparatus and an embodiment of a first system.

FIG. 7 illustrates a block diagram of an apparatus 700 such as may be operative in various embodiments to enable, provide, and/or manage access to a wireless docking station by one or more mobile clients. For example, apparatus 700 may be representative of an apparatus operative to enable, provide, and/or manage access to wireless docking station 102 of FIG. 1 by mobile client 112. In some embodiments, apparatus 700 may be operative to enable, provide, and/or manage access to a wireless docking station within which it is comprised. In various other embodiments, apparatus 700 may itself comprise or contain the wireless docking station. In yet other embodiments, apparatus 700 may be external to the wireless docking station. The embodiments are not limited to these examples. As shown in FIG. 7, apparatus 700 comprises multiple elements including a processor circuit 702, a memory unit 704, a communications component 706, and a management component 708. The embodiments, however, are not limited to the type, number, or arrangement of elements shown in this figure.

In some embodiments, apparatus 700 may comprise processor circuit 702. Processor circuit 702 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 702 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 702 may be implemented as a general purpose processor, such as a processor made by Intel® Corporation, Santa Clara, Calif. The embodiments are not limited in this context.

In various embodiments, apparatus 700 may comprise or be arranged to communicatively couple with a memory unit 704. Memory unit 704 may be implemented using any machine-readable or computer-readable media capable of storing data, including both volatile and non-volatile memory. For example, memory unit 704 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 704 may be included on the same integrated circuit as processor circuit 702, or alternatively some portion or all of memory unit 704 may be disposed on an integrated circuit or other medium, for example a hard disk drive, that is external to the integrated circuit of processor circuit 702. Although memory unit 704 is comprised within apparatus 700 in FIG. 7, memory unit 704 may be external to apparatus 700 in some embodiments. The embodiments are not limited in this context.

In various embodiments, apparatus 700 may comprise a communications component 706. Communications component 706 may comprise logic, circuitry, and/or instructions operative to send messages to one or more remote devices and/or to receive messages from one or more remote devices. In some embodiments, communications component 706 may be operative to send and/or receive messages over one or more wired connections, one or more wireless connections, or a combination of both. In various embodiments, communications component 706 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 700 may comprise a management component 708. Management component 708 may comprise logic, circuitry, and/or instructions generally operative to manage the operations of a wireless docking station, such as wireless docking station 102 of FIG. 1. In various embodiments, management component 708 may be operative to manage the selection, configuration, implementation, and/or advertisement of one or more settings that relate to procedures to be followed in conjunction with use of the wireless docking station by mobile clients, such as mobile client 112 of FIG. 1. For example, in some embodiments, management component 708 may be operative to manage the selection, configuration, implementation, and/or advertisement of one or more settings that relate to procedures to be followed during one or more of initial connection procedure 200 of FIG. 2, communications flow 400 of FIG. 4, communications flow 500 of FIG. 5, and communications flow 600 of FIG. 6. The embodiments are not limited to these examples.

FIG. 7 also illustrates a block diagram of a system 740. System 740 may comprise any of the aforementioned elements of apparatus 700. System 740 may further comprise a radio frequency (RF) transceiver 742. RF transceiver 742 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 742 may operate in accordance with one or more applicable standards in any version. The embodiments are not limited in this context.

In various embodiments, system 740 may comprise one or more RF antennas 744. Examples of any particular RF antenna 744 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 742 may be operative to send and/or receive messages and/or data using one or more RF antennas 744. The embodiments are not limited in this context.

In general operation, apparatus 700 and/or system 740 may be operative to advertise and/or provide access to one or more peripheral devices 755 of a wireless docking station 750. It is worthy of note that although FIG. 7 depicts apparatus 700 and system 740 as both being distinct from— and external to—wireless docking station 750, the embodiments are not limited to this example. In various embodiments, apparatus 700 or system 740 may itself comprise the wireless docking station 750 that includes the one or more peripheral devices 755. In some other embodiments, apparatus 700 and/or system 740 may be comprised within the same wireless docking station 750 as are the one or more peripheral devices 755. In still other embodiments, apparatus 700 and/or system 740 may be external to the wireless docking station 750 that comprises the one or more peripheral devices 755. Examples of peripheral devices 755 in various embodiments may include a display, a mouse, a keyboard, a speaker or set of speakers, a microphone, a webcam, a video camera, a storage device, a printer, a scanner, a fax machine, and a gaming console. The embodiments are not limited to these examples.

In some embodiments, communications component 706 may be operative to send an advertisement message 710 to advertise the wireless docking station 750. In various embodiments, advertisement message 710 may comprise a probe request or a probe response. In some embodiments, advertisement message 710 may comprise docking station identification information 712. In various embodiments, docking station identification information 712 may comprise information that enables one or more mobile clients to discover wireless docking station 750. In some embodiments, docking station identification information 712 may be the same as or similar to docking station identification information 110 of FIG. 1. In various embodiments, advertisement message 710 may comprise docking station configuration information 714. In some embodiments, docking station configuration information 714 may comprise information identifying one or more capabilities, features, and/or settings of wireless docking station 750. In various embodiments, docking station configuration information 714 may be the same as or similar to docking station configuration information 114 of FIG. 1. The embodiments are not limited in this context.

In some embodiments, docking station configuration information 714 may comprise an auto-connect mode setting 716 for the wireless docking station 750. In various embodiments, auto-connect mode setting 716 may indicate whether automatic connection to the wireless docking station 750 is permitted. In some embodiments, docking station configuration information 714 may comprise a persistent pairing setting 718 for the wireless docking station 750. In various embodiments, the persistent pairing setting 718 may indicate whether the wireless docking station 750 allows authentication information reuse. The embodiments are not limited in this context.

In some embodiments, the auto-connect mode setting 716 and/or the persistent pairing setting 718 may be identified by an auto-connect capability IE 715 comprised within advertisement message 710. In various embodiments, auto-connect capability IE 715 may be the same as or similar to information element 300 of FIG. 3. In some embodiments, advertisement message 710 may comprise a probe request or a probe response, and auto-connect capability IE 715 may comprise an IE within that probe request or probe response. In various embodiments, auto-connect capability IE 715 may comprise an auto-connect capabilities field that comprises information identifying auto-connect mode setting 716 and persistent pairing setting 718. In some such embodiments, the auto-connect capabilities field may be the same as or similar to auto-connect capabilities field 306 of FIG. 3. In various such embodiments, the auto-connect capabilities field may comprise a value selected from among a plurality of defined values, where each of the plurality of defined values indicates a particular respective auto-connect mode setting 716 and a particular respective persistent pairing setting 718. The embodiments are not limited in this context.

In some embodiments, communications component 706 may be operative to receive a usage request 762 from a mobile client 760. In various embodiments, usage request 762 may comprise a request to use wireless docking station 750. In some embodiments, management component 708 may be operative to determine whether usage request 762 comprises a renewed usage request or an initial usage request. The term "renewed usage request" is employed herein to denote a usage request that is sent by a mobile client that has previously connected to wireless docking station 750. The term "initial usage request" is employed herein to denote a usage request that is sent by a mobile client that has not previously connected to wireless docking station 750. The embodiments are not limited in this context.

In various embodiments, in response to a determination that usage request 762 comprises an initial usage request, management component 708 may be operative to generate authentication information 720 for an initial authentication handshake with mobile client 760. The term "initial authentication handshake" is employed herein to denote an authentication handshake performed in response to an initial usage request. In some embodiments, the generated authentication information 720 may comprise a digital certificate. In various embodiments, management component 708 may be operative to generate the authentication information 720 using a WPS process. In some embodiments, apparatus 700 and/or system 740 may then be operative to use the generated authentication information 720 to perform the initial authentication handshake with the mobile client 760. In various embodiments, apparatus 700 and/or system 740 may be operative to perform the initial authentication handshake with the mobile client 760 during an authentication phase of an initial connection procedure, such as the authentication phase 206 of initial connection procedure 200 of FIG. 2. In some embodiments, the initial authentication handshake may comprise a WPA2 4-way handshake. The embodiments are not limited in this context.

In various embodiments, management component 708 may be operative to determine whether to preserve the authentication information 720 following the initial authentication handshake, based on persistent pairing setting 718. In some embodiments, management component 708 may be operative to preserve the authentication information 720 following the initial authentication handshake in response to a determination that persistent pairing setting 718 indicates that wireless docking station 750 allows authentication information reuse. In various embodiments, management component 708 may be operative to delete the authentication information 720 following the initial authentication handshake in response to a determination that persistent pairing setting 718 indicates that wireless docking station 750 does not allow authentication information reuse. The embodiments are not limited in this context.

In some embodiments, in response to a determination that usage request 762 comprises a renewed usage request, management component 708 may be operative to determine whether to generate authentication information 720 for a renewed authentication handshake with mobile client 760.

The term "renewed authentication handshake" is employed herein to denote an authentication handshake performed in response to a renewed usage request. In various embodiments, the renewed authentication handshake may comprise a WPA2 4-way handshake. In some embodiments, management component 708 may be operative to determine whether to generate authentication information 720 for the renewed authentication handshake with mobile client 760 based on persistent pairing setting 718.

In various embodiments, management component 708 may be operative to generate authentication information 720 for the renewed authentication handshake in response to a determination that persistent pairing setting 718 indicates that wireless docking station 750 does not allow authentication information reuse. In some embodiments, apparatus 700 and/or system 740 may then be operative to use the generated authentication information 720 to perform the renewed authentication handshake with the mobile client 760. In various embodiments, the generated authentication information 720 may comprise a digital certificate. In some embodiments, management component 708 may be operative to generate the authentication information 720 using a WPS process. In various embodiments, in view of its determination that persistent pairing setting 718 indicates that wireless docking station 750 does not allow authentication information reuse, management component 708 may be operative to delete the authentication information 720 following the renewed authentication handshake. The embodiments are not limited in this context.

In some embodiments, management component 708 may be operative to reuse stored authentication information 722 in response to a determination that persistent pairing setting 718 indicates that wireless docking station 750 allows authentication information reuse. In various embodiments, stored authentication information 722 may comprise authentication information that was generated and/or used on a previous occasion upon which mobile client 760 established a connection to and/or utilized wireless docking station 750. In some embodiments, the stored authentication information 722 may comprise a digital certificate. In various embodiments, the stored authentication information 722 may previously have been generated using a WPS process. In some embodiments, management component 708 may be operative to reuse the stored authentication information 722 by utilizing the stored authentication information 722 to perform the renewed authentication handshake with the mobile client 760. In various embodiments, in view of its determination that persistent pairing setting 718 indicates that wireless docking station 750 allows authentication information reuse, management component 708 may be operative to preserve the stored authentication information 722 following the renewed authentication handshake. The embodiments are not limited in this context.

Figure 8:
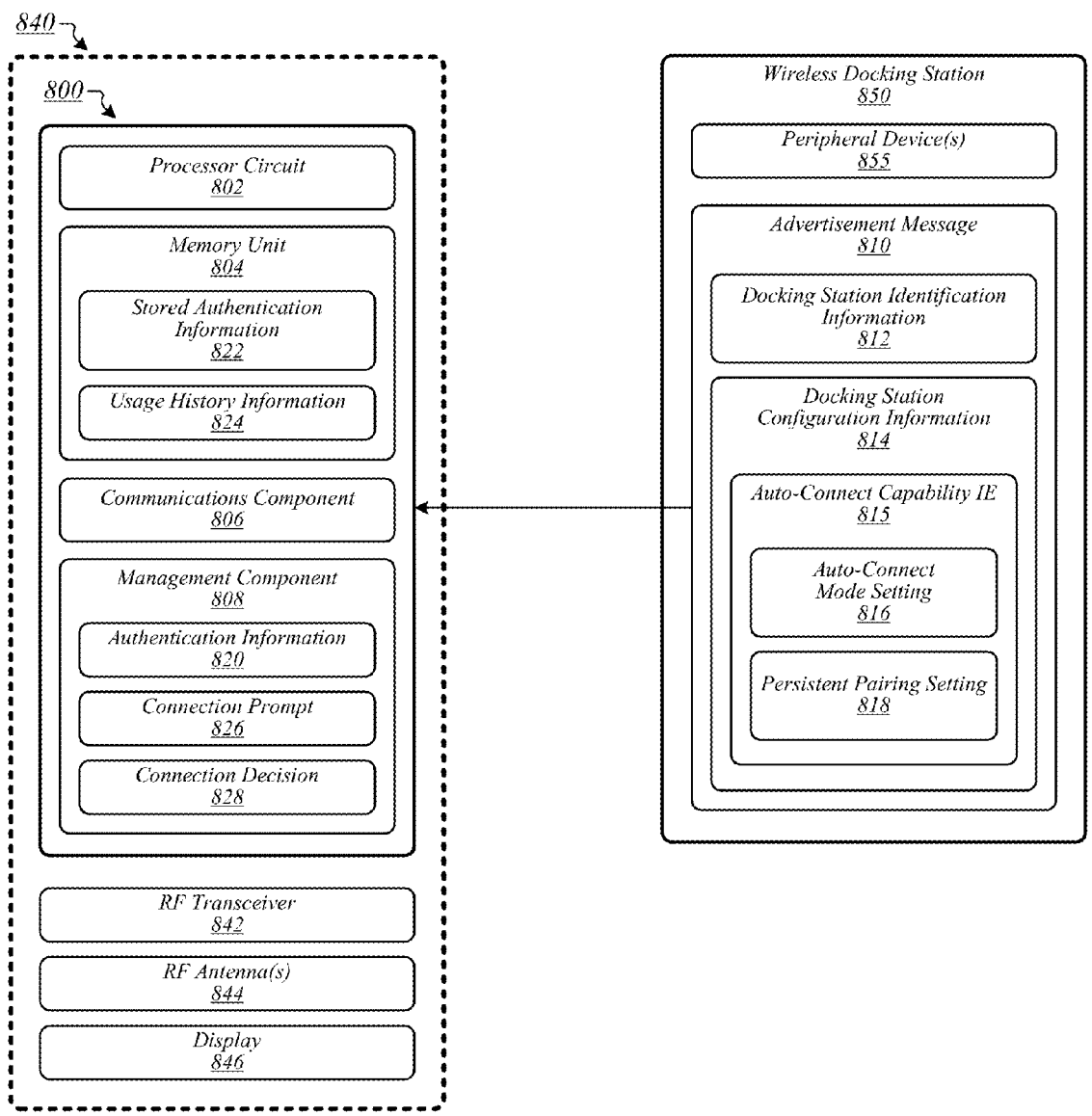
FIG. 8 illustrates an embodiment of a second apparatus and an embodiment of a second system.

FIG. 8 illustrates a block diagram of an apparatus 800 such as may be operative in some embodiments to wirelessly connect to and utilize a wireless docking station. For example, apparatus 800 may be representative of mobile client 112 of FIG. 1 and/or mobile client 760 of FIG. 7. As shown in FIG. 8, apparatus 800 comprises multiple elements including a processor circuit 802, a memory unit 804, a communications component 806, and a management component 808. The embodiments, however, are not limited to the type, number, or arrangement of elements shown in this figure.

In various embodiments, apparatus 800 may comprise processor circuit 802. Processor circuit 802 may be implemented using any processor or logic device, and may be the same as or similar to processor circuit 702 of FIG. 7. The embodiments are not limited in this context.

In some embodiments, apparatus 800 may comprise or be arranged to communicatively couple with a memory unit 804. Memory unit 804 may be implemented using any machine-readable or computer-readable media capable of storing data, including both volatile and non-volatile memory, and may be the same as or similar to memory unit 704 of FIG. 7. It is worthy of note that some portion or all of memory unit 804 may be included on the same integrated circuit as processor circuit 802, or alternatively some portion or all of memory unit 804 may be disposed on an integrated circuit or other medium, for example a hard disk drive, that is external to the integrated circuit of processor circuit 802. Although memory unit 804 is comprised within apparatus 800 in FIG. 8, memory unit 804 may be external to apparatus 800 in various embodiments. The embodiments are not limited in this context.

In some embodiments, apparatus 800 may comprise a communications component 806. Communications component 806 may comprise logic, circuitry, and/or instructions operative to send messages to one or more remote devices and/or to receive messages from one or more remote devices. In various embodiments, communications component 806 may be operative to send and/or receive messages over one or more wired connections, one or more wireless connections, or a combination of both. In some embodiments, communications component 806 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, apparatus 800 may comprise a management component 808. Management component 808 may comprise logic, circuitry, and/or instructions generally operative to manage the operations of apparatus 800. In some embodiments, management component 808 may be operative to manage operations performed by apparatus 800 in conjunction with use of a wireless docking station, such as wireless docking station 102 of FIG. 1 and/or wireless docking station 750 of FIG. 7. For example, in various embodiments, management component 808 may be operative to manage operations performed by apparatus 800 during one or more of initial connection procedure 200 of FIG. 2, communications flow 400 of FIG. 4, communications flow 500 of FIG. 5, and communications flow 600 of FIG. 6. The embodiments are not limited to these examples.

FIG. 8 also illustrates a block diagram of a system 840. System 840 may comprise any of the aforementioned elements of apparatus 800. System 840 may further comprise a radio frequency (RF) transceiver 842. RF transceiver 842 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 842 may operate in accordance with one or more applicable standards in any version. The embodiments are not limited in this context.

In some embodiments, system 840 may comprise one or more RF antennas 844. Examples of any particular RF antenna 844 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, RF transceiver 842 may be operative to send and/or receive messages and/or data using one or more RF antennas 844. The embodiments are not limited in this context.

In various embodiments, system 840 may comprise a display 846. Display 846 may comprise any display device capable of displaying information received from processor circuit 802. In some embodiments, display 846 may comprise a touch-sensitive display screen ("touchscreen"). In various embodiments, display 846 may comprise a monitor, a computer screen, a television, a projector, or another type of display device. In some embodiments, display 846 may be implemented by a liquid crystal display (LCD), light emitting diode (LED) or other type of suitable visual interface. In various embodiments, display 846 may comprise an LCD that includes one or more thin-film transistors (TFTs). The embodiments are not limited in this context.

In some embodiments, during general operation of apparatus 800 and/or system 840, communications component 806 may be operative to receive an advertisement message 810. In various embodiments, advertisement message 810 may comprise a probe request or a probe response. In some embodiments, advertisement message 810 may comprise docking station identification information 812 identifying a wireless docking station 850 that includes one or more peripheral devices 855. In various embodiments, docking station identification information 812, wireless docking station 850 and peripheral device(s) 855 may be the same as or similar to docking station identification information 712, wireless docking station 750 and peripheral device(s) 755 of FIG. 7, respectively. In some embodiments, advertisement message 810 may be transmitted by the wireless docking station 850 or by a device comprised within the wireless docking station 850. However, it is worthy of note that although advertisement message 810 is depicted as originating from wireless docking station 850 in the example of FIG. 8, the embodiments are not so limited. For example, in various other embodiments, the advertisement message 810 may be transmitted by supplemental hardware that is external to wireless docking station 850. The embodiments are not limited in this context.

In some embodiments, advertisement message 810 may comprise docking station configuration information 814. In various embodiments, docking station configuration information 814 may comprise information identifying one or more capabilities, features, and/or settings of wireless docking station 850. In some embodiments, docking station configuration information 814 may be the same as or similar to docking station configuration information 714 of FIG. 7. In various embodiments, docking station configuration information 814 may comprise an auto-connect mode setting 816 for the wireless docking station 850. In some embodiments, auto-connect mode setting 816 may indicate whether automatic connection to the wireless docking station 850 is permitted. In various embodiments, docking station configuration information 814 may comprise a persistent pairing setting 818 for the wireless docking station 850. In some embodiments, the persistent pairing setting 818 may indicate whether the wireless docking station 850 allows authentication information reuse. The embodiments are not limited in this context.

In various embodiments, the auto-connect mode setting 816 and/or the persistent pairing setting 818 may be identified by an auto-connect capability IE 815 comprised within advertisement message 810. In some embodiments, auto-connect capability IE 815 may be the same as or similar to auto-connect capability IE 715 of FIG. 7. In various embodiments, advertisement message 810 may comprise a probe request or a probe response, and auto-connect capability IE 815 may comprise an IE within that probe request or probe response. In some embodiments, auto-connect capability IE 815 may comprise an auto-connect capabilities field that comprises information identifying auto-connect mode setting 816 and persistent pairing setting 818. In various such embodiments, the auto-connect capabilities field may be the same as or similar to auto-connect capabilities field 306 of FIG. 3. In some such embodiments, the auto-connect capabilities field may comprise a value selected from among a plurality of defined values, where each of the plurality of defined values indicates a particular respective auto-connect mode setting 816 and a particular respective persistent pairing setting 818. The embodiments are not limited in this context.

In various embodiments, management component 808 may be operative to discover wireless docking station 850 based on the received advertisement message 810. In some such embodiments, management component 808 may be operative to discover wireless docking station 850 based on the docking station identification information 812 within the received advertisement message 810. In various embodiments, once it has discovered wireless docking station 850, management component 808 may be operative to determine whether wireless docking station 850 comprises a familiar wireless docking station. As employed herein with respect to apparatus 800 and/or system 840, the term "familiar wireless docking station" denotes a wireless docking station to which apparatus 800 and/or system 840 has previously connected. As employed herein with respect to apparatus 800 and/or system 840, the term "unfamiliar wireless docking station" denotes a wireless docking station to which apparatus 800 and/or system 840 has not previously connected. In some embodiments, during ongoing operation of apparatus 800 and/or system 840, management component 808 may be operative to generate, manage, and/or maintain usage history information 824. In various embodiments, usage history information 824 may comprise information identifying one or more wireless docking stations to which apparatus 800 and/or system 840 has previously connected. In some embodiments, management component 808 may be operative to determine whether wireless docking station 850 comprises a familiar wireless docking station based on whether usage history information 824 indicates that apparatus 800 and/or system 840 has previously connected to wireless docking station 850. The embodiments are not limited in this context.

In various embodiments, in response to a determination that wireless docking station 850 comprises an unfamiliar wireless docking station, management component 808 may be operative to generate a connection prompt 826. In some embodiments, connection prompt 826 may comprise a prompt for an indication of whether a connection to wireless docking station 850 is desired. In various embodiments, connection prompt 826 may comprise a prompt for input from a user of apparatus 800 and/or system 840. In some embodiments, connection prompt 826 may comprise one or more visual elements for presentation in a graphical user interface. In various embodiments, management component 808 may be operative to cause connection prompt 826 to be presented on display 846. The embodiments are not limited in this context.

In some embodiments, management component 808 may be operative to receive a connection decision 828 in response to connection prompt 826. In various embodiments, connection decision 828 may comprise an indication of whether a connection to wireless docking station 850 is desired. In some embodiments, connection decision 828 may comprise or be derived from input from a user of apparatus 800 and/or system 840. In various embodiments, apparatus 800 and/or system 840 may be operative to receive such user input via one or more user input devices. In some embodiments, display 846 may comprise a touchscreen, and connection decision 828 may comprise or be derived from user input received via the touchscreen. The embodiments are not limited in this context.

In various embodiments, in response to a determination that connection decision 828 indicates that a connection to wireless docking station 850 is desired, management component 808 may be operative to initiate an initial connection procedure to establish a connection to wireless docking station 850. As employed herein with respect to apparatus 800 and/or system 840, the term "initial connection procedure" denotes a procedure for establishing a connection to an unfamiliar wireless docking station. In some embodiments, management component 808 may be operative to initiate an initial connection procedure that comprises an initial authentication handshake with wireless docking station 850, and may be operative to generate authentication information 820 for the initial authentication handshake. In various embodiments, the generated authentication information 820 may comprise a digital certificate. In some embodiments, management component 808 may be operative to generate the authentication information 820 using a WPS process. In various embodiments, apparatus 800 and/or system 840 may then be operative to use the generated authentication information 820 to perform the initial authentication handshake with the wireless docking station 850. In some embodiments, the initial authentication handshake may comprise a WPA2 4-way handshake. The embodiments are not limited in this context.

In various embodiments, management component 808 may be operative to determine whether to preserve the authentication information 820 following the initial authentication handshake, based on persistent pairing setting 818. In some embodiments, management component 808 may be operative to preserve the authentication information 820 following the initial authentication handshake in response to a determination that persistent pairing setting 818 indicates that wireless docking station 850 allows authentication information reuse. In various embodiments, management component 808 may be operative to delete the authentication information 820 following the initial authentication handshake in response to a determination that persistent pairing setting 818 indicates that wireless docking station 850 does not allow authentication information reuse. The embodiments are not limited in this context.

In some embodiments, in response to a determination that wireless docking station 850 comprises a familiar wireless docking station, management component 808 may be operative to determine whether to automatically initiate a renewed connection procedure to establish a connection to wireless docking station 850. As employed herein with respect to apparatus 800 and/or system 840, the term "renewed connection procedure" denotes a procedure for establishing a connection to an familiar wireless docking station. In various embodiments, management component 808 may be operative to determine whether to automatically initiate the renewed connection procedure based on auto-connect mode setting 816. In some embodiments, the renewed connection procedure may comprise an renewed authentication handshake. In various embodiments, the renewed authentication handshake may comprise a WPA2 4-way handshake. The embodiments are not limited in this context.

In some embodiments, in response to a determination that auto-connect mode setting 816 indicates that automatic connection to wireless docking station 850 is permitted, management component 808 may be operative to automatically initiate the renewed connection procedure. In various embodiments, in response to a determination that auto-connect mode setting 816 indicates that automatic connection to wireless docking station 850 is not permitted, management component 808 may be operative to generate a connection prompt 826. In some embodiments, management component 808 may be operative to receive a connection decision 828 in response to connection prompt 826. In various embodiments, management component 808 may then be operative to determine whether to initiate the renewed connection procedure based on connection decision 828. In some embodiments, in response to a determination that connection decision 828 indicates that a connection to wireless docking station 850 is desired, management component 808 may be operative to initiate the renewed connection procedure. The embodiments are not limited in this context.

In various embodiments, for an initiated renewed connection procedure comprising a renewed authentication handshake, management component 808 may be operative to determine whether to generate authentication information 820 based on persistent pairing setting 818. In some embodiments, management component 808 may be operative to generate authentication information 820 for the renewed authentication handshake in response to a determination that persistent pairing setting 818 indicates that wireless docking station 850 does not allow authentication information reuse. In various embodiments, apparatus 800 and/or system 840 may then be operative to use the generated authentication information 820 to perform the renewed authentication handshake. In some embodiments, the generated authentication information 820 may comprise a digital certificate. In various embodiments, management component 808 may be operative to generate the authentication information 820 using a WPS process. In some embodiments, in view of its determination that persistent pairing setting 818 indicates that wireless docking station 850 does not allow authentication information reuse, management component 808 may be operative to delete the authentication information 820 following the renewed authentication handshake. The embodiments are not limited in this context.

In various embodiments, management component 808 may be operative to reuse stored authentication information 822 in response to a determination that persistent pairing setting 818 indicates that wireless docking station 850 allows authentication information reuse. In some embodiments, stored authentication information 822 may comprise authentication information that was generated and/or used on a previous occasion upon which apparatus 800 and/or system 840 established a connection to and/or utilized wireless docking station 850. In various embodiments, the stored authentication information 822 may comprise a digital certificate. In some embodiments, the stored authentication information 822 may previously have been generated using a WPS process. In various embodiments, management component 808 may be operative to reuse the stored authentication information 822 by utilizing the stored authentication information 822 to perform the renewed authentication handshake. In some embodiments, in view of its determination that persistent pairing setting 818 indicates that wireless docking station 850 allows authentication information reuse, management component 808 may be operative to preserve the stored authentication information 822 following the renewed authentication handshake. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 9 illustrates one embodiment of a logic flow 900, which may be representative of the operations executed by one or more embodiments described herein. For example, logic flow 900 may be representative of operations that may be performed in various embodiments by apparatus 700 and/or system 740 of FIG. 7. As shown in logic flow 900, an advertisement message may be sent at 902 to advertise a wireless docking station, and the advertisement message may comprise a persistent pairing setting. For example, communications component 706 of FIG. 7 may be operative to send advertisement message 710 to advertise wireless docking station 750, and advertisement message 710 may comprise persistent pairing setting 718. At 904, a request to use the wireless docking station may be received. For example, communications component 706 of FIG. 7 may be operative to receive request 762 from mobile client 760.

At 906, it may be determined whether the request comprises a renewed usage request. For example, management component 708 of FIG. 7 may be operative to determine whether request 762 comprises a renewed usage request. At 908, in response to a determination that the request comprises a renewed usage request, it may be determined whether to generate authentication information for an authentication handshake, based on the persistent pairing setting. For example, in response to a determination that request 762 comprises a renewed usage request, management component 708 of FIG. 7 may be operative to determine whether to generate authentication information 720 for a renewed authentication handshake with mobile client 760. The embodiments are not limited to these examples.

FIG. 10 illustrates one embodiment of a logic flow 1000, which may be representative of the operations executed by one or more embodiments described herein. For example, logic flow 1000 may be representative of operations that may be performed in some embodiments by apparatus 800 and/or system 840 of FIG. 8. As shown in logic flow 1000, a wireless docking station may be discovered at 1002 based on a received advertisement message comprising an auto-connect mode setting. For example, management component 808 of FIG. 8 may be operative to discover wireless docking station 850 based on a received advertisement message 810 that comprises an auto-connect mode setting 816. At 1004, it may be determined whether the wireless docking station comprises a familiar wireless docking station. For example, management component 808 of FIG. 8 may be operative to determine whether wireless docking station 850 comprises a familiar wireless docking station based on usage history information 824. At 1006, in response to a determination that the wireless docking station comprises a familiar wireless docking station, it may be determined whether to automatically initiate a connection procedure, based on the auto-connect mode setting. For example, in response to a determination that wireless docking station 850 of FIG. 8 comprises a familiar wireless docking station, management component 808 may determine, based on auto-connect mode setting 816, whether to automatically initiate a renewed connection procedure to connect to wireless docking station 850. The embodiments are not limited to these examples.

FIG. 11A illustrates an embodiment of a first storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement logic flow 900 of FIG. 9. In various embodiments, storage medium 1100 may comprise one or more sets of instructions for execution by apparatus 700 and/or system 740 of FIG. 7 in order to implement logic flow 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 11B illustrates an embodiment of a second storage medium 1150. Storage medium 1150 may comprise any non-transitory computer-readable storage medium or machine-readable storage medium, such as an optical, magnetic or semiconductor storage medium. In various embodiments, storage medium 1150 may comprise an article of manufacture. In some embodiments, storage medium 1150 may store computer-executable instructions, such as computer-executable instructions to implement logic flow 1000 of FIG. 10. In some embodiments, storage medium 1150 may comprise one or more sets of instructions for execution by apparatus 800 and/or system 840 of FIG. 8 in order to implement logic flow 1000 of FIG. 10. The embodiments are not limited in this context.

Figure 12:
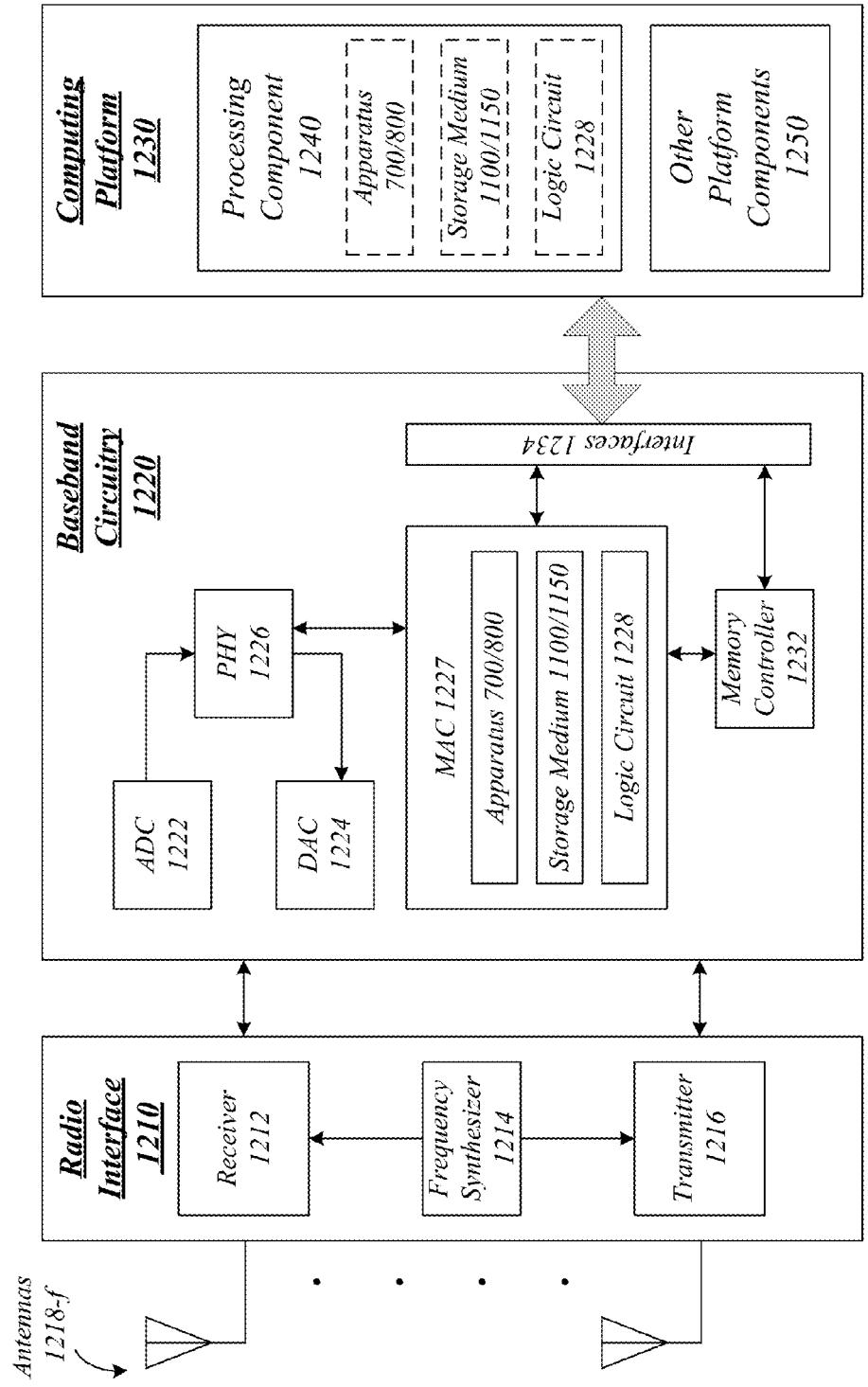
FIG. 12 illustrates an embodiment of a device.

FIG. 12 illustrates an embodiment of a communications device 1200 that may implement one or more of apparatus 700 and/or system 740 of FIG. 7, apparatus 800 and/or system 840 of FIG. 8, logic flow 900 of FIG. 9, logic flow 1000 of FIG. 10, storage medium 1100 of FIG. 11A, and storage medium 1150 of FIG. 11B. In various embodiments, device 1200 may comprise a logic circuit 1228. The logic circuit 1228 may include physical circuits to perform operations described for one or more of apparatus 700 and/or system 740 of FIG. 7, apparatus 800 and/or system 840 of FIG. 8, logic flow 900 of FIG. 9, and logic flow 1000 of FIG. 10, for example. As shown in FIG. 12, device 1200 may include a radio interface 1210, baseband circuitry 1220, and computing platform 1230, although the embodiments are not limited to this configuration.

The device 1200 may implement some or all of the structure and/or operations for one or more of apparatus 700 and/or system 740 of FIG. 7, apparatus 800 and/or system 840 of FIG. 8, logic flow 900 of FIG. 9, logic flow 1000 of FIG. 10, storage medium 1100 of FIG. 11A, storage medium 1150 of FIG. 11B, and logic circuit 1228 in a single computing entity, such as entirely within a single device. Alternatively, the device 1200 may distribute portions of the structure and/or operations for one or more of 700 and/or system 740 of FIG. 7, apparatus 800 and/or system 840 of FIG. 8, logic flow 900 of FIG. 9, logic flow 1000 of FIG. 10, storage medium 1100 of FIG. 11A, storage medium 1150 of FIG. 11B, and logic circuit 1228 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1210 may include, for example, a receiver 1212, a frequency synthesizer 1214, and/or a transmitter 1216. Radio interface 1210 may include bias controls, a crystal oscillator and/or one or more antennas 1218-*f*. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a medium access control (MAC) processing circuit 1227 for MAC/data link layer processing. Baseband circuitry 1220 may include a memory controller 1232 for communicating with MAC processing circuit 1227 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames. Alternatively or in addition, MAC processing circuit 1227 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for one or more of 700 and/or system 740 of FIG. 7, apparatus 800 and/or system 840 of FIG. 8, logic flow 900 of FIG. 9, logic flow 1000 of FIG. 10, storage medium 1100 of FIG. 11A, storage medium 1150 of FIG. 11B, and logic circuit 1228 using the processing component 1240. The processing component 1240 (and/or PHY 1226 and/or MAC 1227) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired.

Embodiments of device 1200 may be implemented using single input single output (SISO) architectures. However, certain implementations may include multiple antennas (e.g., antennas 1218-*f*) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 13:
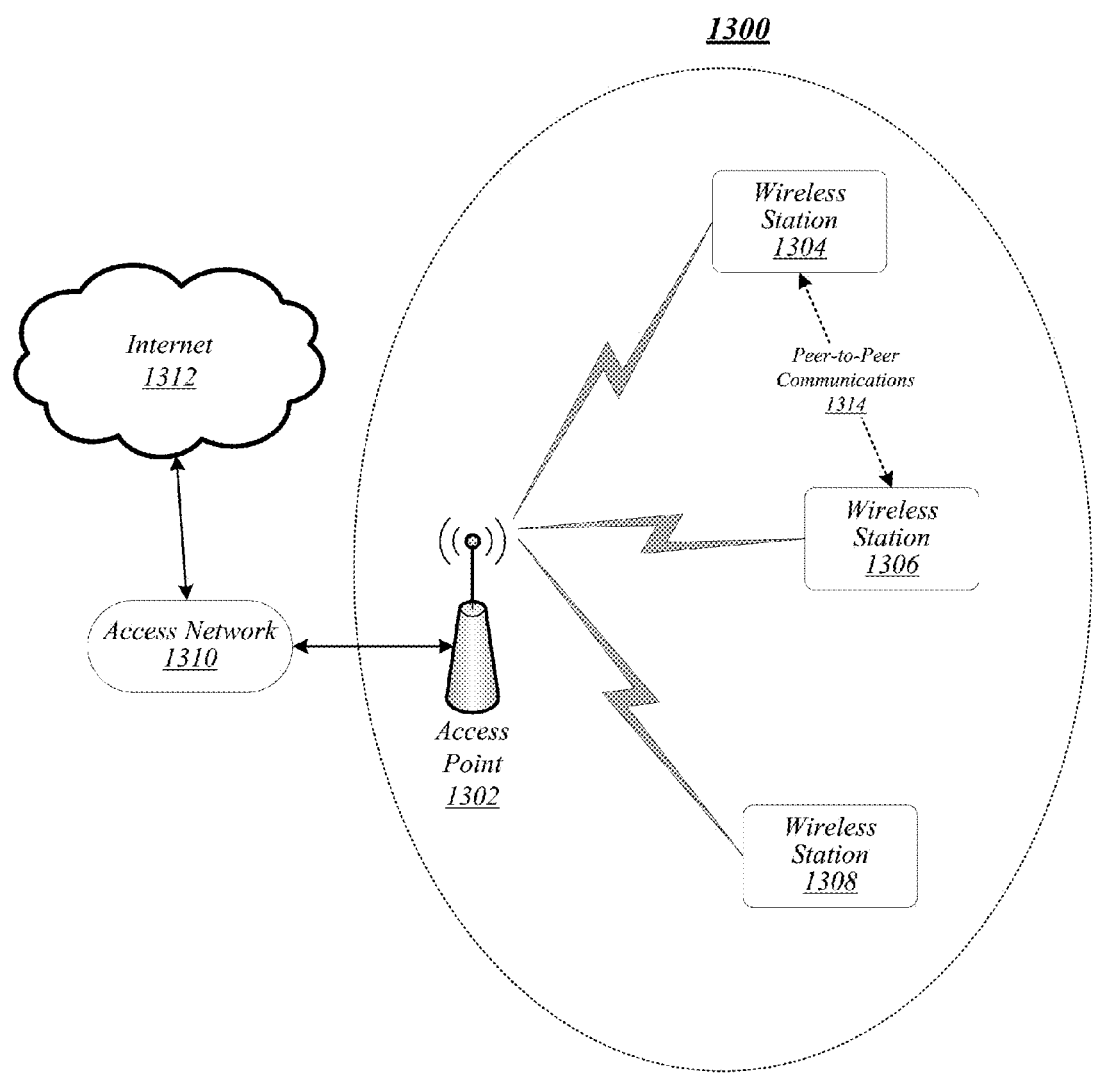
FIG. 13 illustrates an embodiment of a wireless network.

FIG. 13 illustrates an embodiment of a wireless network 1300. As shown in FIG. 13, wireless network comprises an access point 1302 and wireless stations 1304, 1306, and 1308. In various embodiments, wireless network 1300 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1300 may comprise another type of wireless network, and/or may implement other wireless communications standards. In various embodiments, for example, wireless network 1300 may comprise a WWAN or WPAN rather than a WLAN. The embodiments are not limited to this example.

In some embodiments, wireless network 1300 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1304, 1306, and 1308 may communicate with access point 1302 in order to obtain connectivity to one or more external data networks. In some embodiments, for example, wireless stations 1304, 1306, and 1308 may connect to the Internet 1312 via access point 1302 and access network 1310. In various embodiments, access network 1310 may comprise a private network that provides subscription-based Internet-connectivity, such as an Internet Service Provider (ISP) network. The embodiments are not limited to this example.

In various embodiments, two or more of wireless stations 1304, 1306, and 1308 may communicate with each other directly by exchanging peer-to-peer communications. For example, in the example of FIG. 13, wireless stations 1304 and 1306 communicate with each other directly by exchanging peer-to-peer communications 1314. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising logic, at least a portion of which is in hardware, the logic to send an advertisement message to advertise a wireless docking station, the advertisement message to comprise a persistent pairing setting for the wireless docking station, the logic to receive a request to use the wireless docking station, determine whether the request comprises a renewed usage request and, in response to a determination that the request comprises a renewed usage request, determine whether to generate authentication information for an authentication handshake based on the persistent pairing setting.

In Example 2, the persistent pairing setting of Example 1 may optionally indicate whether the wireless docking station allows authentication information reuse.

In Example 3, the logic of any of Examples 1 to 2 may optionally generate authentication information for the authentication handshake in response to a determination that the persistent pairing setting indicates that the wireless docking station does not allow authentication information reuse.

In Example 4, the logic of Example 3 may optionally perform the authentication handshake using the generated authentication information.

In Example 5, the generated authentication information of any of Examples 3 to 4 may optionally comprise a digital certificate.

In Example 6, the logic of any of Examples 3 to 5 may optionally generate the authentication information using a Wi-Fi Protected Setup (WPS) process.

In Example 7, the logic of any of Examples 1 to 2 may optionally perform the authentication handshake by reusing stored authentication information in response to a determination that the persistent pairing setting indicates that the wireless docking station allows authentication information reuse.

In Example 8, the authentication handshake of any of Examples 1 to 7 may optionally comprise a Wi-Fi Protected Access II (WPA2) 4-way handshake.

In Example 9, the logic of any of Examples 1 to 2 may optionally generate authentication information for an initial authentication handshake in response to a determination that the request comprises an initial usage request.

In Example 10, the logic of Example 9 may optionally perform the initial authentication handshake using the generated authentication information.

In Example 11, the logic of any of Examples 9 to 10 may optionally determine, based on the persistent pairing setting, whether to preserve the generated authentication information following the initial authentication handshake.

In Example 12, the logic of any of Examples 9 to 11 may optionally preserve the generated authentication information following the initial authentication handshake in response to a determination that the persistent pairing setting indicates that the wireless docking station allows authentication information reuse.

In Example 13, the logic of any of Examples 9 to 11 may optionally delete the generated authentication information following the initial authentication handshake in response to a determination that the persistent pairing setting indicates that the wireless docking station does not allow authentication information reuse.

In Example 14, the advertisement message of any of Examples 1 to 13 may optionally comprise a probe request.

In Example 15, the advertisement message of any of Examples 1 to 13 may optionally comprise a probe response.

In Example 16, the advertisement message of any of Examples 1 to 15 may optionally comprise an auto-connect mode setting for the wireless docking station.

In Example 17, the auto-connect mode setting of Example 16 may optionally indicate whether automatic connection to the wireless docking station is permitted.

In Example 18, the advertisement message of any of Examples 16 to 17 may optionally comprise an auto-connect capability information element (IE), the auto-connect capability IE to identify the auto-connect mode setting and the persistent pairing setting.

In Example 19, the auto-connect capability IE of Example 18 may optionally comprise an element identifier (ID) field, the element ID field to comprise a value indicating that the auto-connect capability IE comprises an auto-connect capability IE.

In Example 20, the auto-connect capability IE of any of Examples 18 to 19 may optionally comprise an auto-connect capabilities field, the auto-connect capabilities field to comprise information identifying the auto-connect mode setting and the persistent pairing setting.

In Example 21, the auto-connect capability IE of Example 20 may optionally comprise a length field, the length field to comprise a value indicating a length of the auto-connect capabilities field.

In Example 22, the auto-connect capabilities field of any of Examples 20 to 21 may optionally comprise a value selected from among a plurality of defined values, each of the plurality of defined values to indicate a particular respective auto-connect mode setting and a particular respective persistent pairing setting.

In Example 23, the plurality of defined values of Example 22 may optionally include a defined value that indicates that automatic connection to the wireless docking station is not permitted and that the wireless docking station allows authentication information reuse.

In Example 24, the plurality of defined values of any of Examples 22 to 23 may optionally include a defined value that indicates that automatic connection to the wireless docking station is not permitted and that the wireless docking station does not allow authentication information reuse.

In Example 25, the plurality of defined values of any of Examples 22 to 24 may optionally include a defined value that indicates that automatic connection to the wireless docking station is permitted and that the wireless docking station allows authentication information reuse.

Example 26 is a system, comprising a wireless communication apparatus according to any of Examples 1 to 25, a radio frequency (RF) transceiver, and one or more RF antennas.

Example 27 is a wireless communication apparatus, comprising logic, at least a portion of which is in hardware, the logic to discover a wireless docking station based on a received advertisement message, the advertisement message to comprise an auto-connect mode setting, the logic to determine whether the wireless docking station comprises a familiar wireless docking station and, in response to a determination that the wireless docking station comprises a familiar wireless docking station, determine whether to automatically initiate a connection procedure to establish a connection to the wireless docking station based on the auto-connect mode setting.

In Example 28, the auto-connect mode setting of Example 27 may optionally indicate whether automatic connection to the wireless docking station is permitted.

In Example 29, the logic of any of Examples 27 to 28 may optionally automatically initiate the connection procedure in response to a determination that the auto-connect mode setting indicates that automatic connection to the wireless docking station is permitted.

In Example 30, the logic of any of Examples 27 to 28 may optionally generate a connection prompt in response to a determination that the auto-connect mode setting indicates that automatic connection to the wireless docking station is not permitted.

In Example 31, the logic of Example 30 may optionally receive a connection decision in response to the connection prompt and, in response to a determination that the connection decision indicates that a connection to the wireless docking station is desired, initiate the connection procedure.

In Example 32, the connection decision of Example 31 may optionally comprise user input.

In Example 33, the advertisement message of any of Examples 27 to 32 may optionally comprise a probe request.

In Example 34, the advertisement message of any of Examples 27 to 32 may optionally comprise a probe response.

In Example 35, the advertisement message of any of Examples 27 to 34 may optionally comprise a persistent pairing setting.

In Example 36, the persistent pairing setting of Example 35 may optionally indicate whether the wireless docking station allows authentication information reuse.

In Example 37, the connection procedure of any of Examples 35 to 36 may optionally comprise an authentication handshake.

In Example 38, the authentication handshake of Example 37 may optionally comprise a Wi-Fi Protected Access II (WPA2) 4-way handshake.

In Example 39, the logic of any of Examples 35 to 38 may optionally determine whether to generate authentication information for an initiated connection procedure based on the persistent pairing setting.

In Example 40, the logic of Example 39 may optionally generate authentication information for the initiated connection procedure in response to a determination that the persistent pairing setting indicates that the wireless docking station does not allow authentication information reuse.

In Example 41, the logic of Example 40 may optionally perform an authentication handshake using the generated authentication information.

In Example 42, the generated authentication information of any of Examples 40 to 41 may optionally comprise a digital certificate.

In Example 43, the logic of any of Examples 40 to 42 may optionally generate the authentication information using a Wi-Fi Protected Setup (WPS) process.

In Example 44, the logic of Example 39 may optionally perform an authentication handshake by reusing stored authentication information in response to a determination that the persistent pairing setting indicates that the wireless docking station allows authentication information reuse.

In Example 45, the advertisement message of any of Examples 35 to 44 may optionally comprise an auto-connect capability information element (IE), the auto-connect capability IE to identify the auto-connect mode setting and the persistent pairing setting.

In Example 46, the auto-connect capability IE of Example 45 may optionally comprise an element identifier (ID) field, the element ID field to comprise a value indicating that the auto-connect capability IE comprises an auto-connect capability IE.

In Example 47, the auto-connect capability IE of any of Examples 45 to 46 may optionally comprise an auto-connect capabilities field, the auto-connect capabilities field to comprise information identifying the auto-connect mode setting and the persistent pairing setting.

In Example 48, the auto-connect capability IE of Example 47 may optionally comprise a length field, the length field to comprise a value indicating a length of the auto-connect capabilities field.

In Example 49, the auto-connect capabilities field of any of Examples 47 to 48 may optionally comprise a value comprised among a plurality of defined values, each of the plurality of defined values to indicate a particular respective auto-connect mode setting and a particular respective persistent pairing setting.

In Example 50, the plurality of defined values of Example 49 may optionally include a defined value that indicates that automatic connection to the wireless docking station is not permitted and that the wireless docking station allows authentication information reuse.

In Example 51, the plurality of defined values of any of Examples 49 to 50 may optionally include a defined value that indicates that automatic connection to the wireless docking station is not permitted and that the wireless docking station does not allow authentication information reuse.

In Example 52, the plurality of defined values of any of Examples 49 to 51 may optionally include a defined value that indicates that automatic connection to the wireless docking station is permitted and that the wireless docking station allows authentication information reuse.

In Example 53, the logic of any of Examples 35 to 52 may optionally generate a connection prompt in response to a determination that the wireless docking station does not comprise a familiar wireless docking station.

In Example 54, the logic of Example 53 may optionally receive a connection decision in response to the connection prompt and, in response to a determination that the connection decision indicates that a connection to the wireless docking station is desired, generate authentication information for an initial authentication handshake.

In Example 55, the logic of Example 54 may optionally perform the initial authentication handshake using the generated authentication information.

In Example 56, the logic of Example 55 may optionally determine, based on the persistent pairing setting, whether to preserve the generated authentication information following the initial authentication handshake.

In Example 57, the logic of Example 56 may optionally preserve the generated authentication information following the initial authentication handshake in response to a determination that the persistent pairing setting indicates that the wireless docking station allows authentication information reuse.

In Example 58, the logic of Example 56 may optionally delete the generated authentication information following the initial authentication handshake in response to a determination that the persistent pairing setting indicates that the wireless docking station does not allow authentication information reuse.

Example 59 is a system, comprising a wireless communication apparatus according to any of Examples 27 to 58, a radio frequency (RF) transceiver, and one or more RF antennas.

In Example 60, the system of Example 59 may optionally comprise a display.

Example 61 is at least one non-transitory computer-readable storage medium, comprising a set of wireless communication instructions that, in response to being executed on a computing device, cause the computing device to send an advertisement message to advertise a wireless docking station, the advertisement message to comprise a persistent pairing setting for the wireless docking station, receive a request to use the wireless docking station, determine whether the request comprises a renewed usage request, and in response to a determination that the request comprises a renewed usage request, determine whether to generate authentication information for an authentication handshake based on the persistent pairing setting.

In Example 62, the persistent pairing setting of Example 61 may optionally indicate whether the wireless docking station allows authentication information reuse.

In Example 63, the at least one non-transitory computer-readable storage medium of any of Examples 61 to 62 may optionally comprise wireless communication instructions that, in response to being executed on the computing device, cause the computing device to generate authentication information for the authentication handshake in response to a determination that the persistent pairing setting indicates that the wireless docking station does not allow authentication information reuse.

In Example 64, the at least one non-transitory computer-readable storage medium of Example 63 may optionally comprise wireless communication instructions that, in response to being executed on the computing device, cause the computing device to perform the authentication handshake using the generated authentication information.

In Example 65, the generated authentication information of any of Examples 63 to 64 may optionally comprise a digital certificate.

In Example 66, the at least one non-transitory computer-readable storage medium of any of Examples 63 to 65 may optionally comprise wireless communication instructions that, in response to being executed on the computing device, cause the computing device to generate the authentication information using a Wi-Fi Protected Setup (WPS) process.

In Example 67, the at least one non-transitory computer-readable storage medium of any of Examples 61 to 62 may optionally comprise wireless communication instructions that, in response to being executed on the computing device, cause the computing device to perform the authentication handshake by reusing stored authentication information in response to a determination that the persistent pairing setting indicates that the wireless docking station allows authentication information reuse.

In Example 68, the authentication handshake of any of Examples 61 to 67 may optionally comprise a Wi-Fi Protected Access II (WPA2) 4-way handshake.

In Example 69, the at least one non-transitory computer-readable storage medium of any of Examples 61 to 62 may optionally comprise wireless communication instructions that, in response to being executed on the computing device, cause the computing device to generate authentication information for an initial authentication handshake in response to a determination that the request comprises an initial usage request.

In Example 70, the at least one non-transitory computer-readable storage medium of Example 69 may optionally comprise wireless communication instructions that, in response to being executed on the computing device, cause the computing device to perform the initial authentication handshake using the generated authentication information.

In Example 71, the at least one non-transitory computer-readable storage medium of Example 70 may optionally comprise wireless communication instructions that, in response to being executed on the computing device, cause the computing device to determine, based on the persistent pairing setting, whether to preserve the generated authentication information following the initial authentication handshake.

In Example 72, the at least one non-transitory computer-readable storage medium of Example 71 may optionally comprise wireless communication instructions that, in response to being executed on the computing device, cause the computing device to preserve the generated authentication information following the initial authentication handshake in response to a determination that the persistent pairing setting indicates that the wireless docking station allows authentication information reuse.

In Example 73, the at least one non-transitory computer-readable storage medium of Example 71 may optionally comprise wireless communication instructions that, in response to being executed on the computing device, cause the computing device to delete the generated authentication information following the initial authentication handshake in response to a determination that the persistent pairing setting indicates that the wireless docking station does not allow authentication information reuse.

In Example 74, the advertisement message of any of Examples 61 to 73 may optionally comprise a probe request.

In Example 75, the advertisement message of any of Examples 61 to 73 may optionally comprise a probe response.

In Example 76, the advertisement message of any of Examples 61 to 75 may optionally comprise an auto-connect mode setting for the wireless docking station.

In Example 77, the auto-connect mode setting of Example 76 may optionally indicate whether automatic connection to the wireless docking station is permitted.

In Example 78, the advertisement message of any of Examples 76 to 77 may optionally comprise an auto-connect capability information element (IE), the auto-connect capability IE to identify the auto-connect mode setting and the persistent pairing setting.

In Example 79, the auto-connect capability IE of Example 78 may optionally comprise an element identifier (ID) field, the element ID field to comprise a value indicating that the auto-connect capability IE comprises an auto-connect capability IE.

In Example 80, the auto-connect capability IE of any of Examples 78 to 79 may optionally comprise an auto-connect capabilities field, the auto-connect capabilities field to comprise information identifying the auto-connect mode setting and the persistent pairing setting.

In Example 81, the auto-connect capability IE of Example 80 may optionally comprise a length field, the length field to comprise a value indicating a length of the auto-connect capabilities field.

In Example 82, the auto-connect capabilities field of any of Examples 80 to 81 may optionally comprise a value selected from among a plurality of defined values, each of the plurality of defined values to indicate a particular respective auto-connect mode setting and a particular respective persistent pairing setting.

In Example 83, the plurality of defined values of Example 82 may optionally include a defined value that indicates that automatic connection to the wireless docking station is not permitted and that the wireless docking station allows authentication information reuse.

In Example 84, the plurality of defined values of any of Examples 82 to 83 may optionally include a defined value that indicates that automatic connection to the wireless docking station is not permitted and that the wireless docking station does not allow authentication information reuse.

In Example 85, the plurality of defined values of any of Examples 82 to 84 may optionally include a defined value that indicates that automatic connection to the wireless docking station is permitted and that the wireless docking station allows authentication information reuse.

Example 86 is at least one non-transitory computer-readable storage medium, comprising a set of wireless communication instructions that, in response to being executed on a computing device, cause the computing device to discover a wireless docking station based on a received advertisement message, the advertisement message to comprise an auto-connect mode setting, determine whether the wireless docking station comprises a familiar wireless docking station, and in response to a determination that the wireless docking station comprises a familiar wireless docking station, determine whether to automatically initiate a connection procedure to establish a connection to the wireless docking station based on the auto-connect mode setting.

In Example 87, the auto-connect mode setting of Example 86 may optionally indicate whether automatic connection to the wireless docking station is permitted.

In Example 88, the at least one non-transitory computer-readable storage medium of any of Examples 86 to 87 may optionally comprise wireless communication instructions that, in response to being executed on the computing device, cause the computing device to automatically initiate the connection procedure in response to a determination that the auto-connect mode setting indicates that automatic connection to the wireless docking station is permitted.

In Example 89, the at least one non-transitory computer-readable storage medium of any of Examples 86 to 87 may optionally comprise wireless communication instructions that, in response to being executed on the computing device, cause the computing device to generate a connection prompt in response to a determination that the auto-connect mode setting indicates that automatic connection to the wireless docking station is not permitted.

In Example 90, the at least one non-transitory computer-readable storage medium of Example 89 may optionally comprise wireless communication instructions that, in response to being executed on the computing device, cause the computing device to receive a connection decision in response to the connection prompt, and in response to a determination that the connection decision indicates that a connection to the wireless docking station is desired, initiate the connection procedure.

In Example 91, the connection decision of Example 90 may optionally comprise user input.

In Example 92, the advertisement message of any of Examples 86 to 91 may optionally comprise a probe request.

In Example 93, the advertisement message of any of Examples 86 to 91 may optionally comprise a probe response.

In Example 94, the advertisement message of any of Examples 86 to 93 may optionally comprise a persistent pairing setting.

In Example 95, the persistent pairing setting of Example 94 may optionally indicate whether the wireless docking station allows authentication information reuse.

In Example 96, the connection procedure of any of Examples 94 to 95 may optionally comprise an authentication handshake.

In Example 97, the authentication handshake of Example 96 may optionally comprise a Wi-Fi Protected Access II (WPA2) 4-way handshake.

In Example 98, the at least one non-transitory computer-readable storage medium of any of Examples 94 to 97 may optionally comprise wireless communication instructions that, in response to being executed on the computing device, cause the computing device to determine whether to generate authentication information for an initiated connection procedure based on the persistent pairing setting.

In Example 99, the at least one non-transitory computer-readable storage medium of Example 98 may optionally comprise wireless communication instructions that, in response to being executed on the computing device, cause the computing device to generate authentication information for the initiated connection procedure in response to a determination that the persistent pairing setting indicates that the wireless docking station does not allow authentication information reuse.

In Example 100, the at least one non-transitory computer-readable storage medium of Example 99 may optionally comprise wireless communication instructions that, in response to being executed on the computing device, cause the computing device to perform an authentication handshake using the generated authentication information.

In Example 101, the generated authentication information of any of Examples 99 to 100 may optionally comprise a digital certificate.

In Example 102, the at least one non-transitory computer-readable storage medium of any of Examples 99 to 101 may optionally comprise wireless communication instructions that, in response to being executed on the computing device, cause the computing device to generate the authentication information using a Wi-Fi Protected Setup (WPS) process.

In Example 103, the at least one non-transitory computer-readable storage medium of Example 98 may optionally comprise wireless communication instructions that, in response to being executed on the computing device, cause the computing device to perform an authentication handshake by reusing stored authentication information in response to a determination that the persistent pairing setting indicates that the wireless docking station allows authentication information reuse.

In Example 104, the advertisement message of any of Examples 94 to 103 may optionally comprise an auto-connect capability information element (IE), the auto-connect capability IE to identify the auto-connect mode setting and the persistent pairing setting.

In Example 105, the auto-connect capability IE of Example 104 may optionally comprise an element identifier (ID) field, the element ID field to comprise a value indicating that the auto-connect capability IE comprises an auto-connect capability IE.

In Example 106, the auto-connect capability IE of any of Examples 104 to 105 may optionally comprise an auto-connect capabilities field, the auto-connect capabilities field to comprise information identifying the auto-connect mode setting and the persistent pairing setting.

In Example 107, the auto-connect capability IE of Example 106 may optionally comprise a length field, the length field to comprise a value indicating a length of the auto-connect capabilities field.

In Example 108, the auto-connect capabilities field of any of Examples 106 to 107 may optionally comprise a value comprised among a plurality of defined values, each of the plurality of defined values to indicate a particular respective auto-connect mode setting and a particular respective persistent pairing setting.

In Example 109, the plurality of defined values of Example 108 may optionally include a defined value that indicates that automatic connection to the wireless docking station is not permitted and that the wireless docking station allows authentication information reuse.

In Example 110, the plurality of defined values of any of Examples 108 to 109 may optionally include a defined value that indicates that automatic connection to the wireless docking station is not permitted and that the wireless docking station does not allow authentication information reuse.

In Example 111, the plurality of defined values of any of Examples 108 to 110 may optionally include a defined value that indicates that automatic connection to the wireless docking station is permitted and that the wireless docking station allows authentication information reuse.

In Example 112, the at least one non-transitory computer-readable storage medium of any of Examples 94 to 111 may optionally comprise wireless communication instructions that, in response to being executed on the computing device, cause the computing device to generate a connection prompt in response to a determination that the wireless docking station does not comprise a familiar wireless docking station.

In Example 113, the at least one non-transitory computer-readable storage medium of Example 112 may optionally comprise wireless communication instructions that, in response to being executed on the computing device, cause the computing device to receive a connection decision in response to the connection prompt and, in response to a determination that the connection decision indicates that a connection to the wireless docking station is desired, generate authentication information for an initial authentication handshake.

In Example 114, the at least one non-transitory computer-readable storage medium of Example 113 may optionally comprise wireless communication instructions that, in response to being executed on the computing device, cause the computing device to perform the initial authentication handshake using the generated authentication information.

In Example 115, the at least one non-transitory computer-readable storage medium of Example 114 may optionally comprise wireless communication instructions that, in response to being executed on the computing device, cause the computing device to determine, based on the persistent pairing setting, whether to preserve the generated authentication information following the initial authentication handshake.

In Example 116, the at least one non-transitory computer-readable storage medium of Example 115 may optionally comprise wireless communication instructions that, in response to being executed on the computing device, cause the computing device to preserve the generated authentication information following the initial authentication handshake in response to a determination that the persistent pairing setting indicates that the wireless docking station allows authentication information reuse.

In Example 117, the at least one non-transitory computer-readable storage medium of Example 115 may optionally comprise wireless communication instructions that, in response to being executed on the computing device, cause the computing device to delete the generated authentication information following the initial authentication handshake in response to a determination that the persistent pairing setting indicates that the wireless docking station does not allow authentication information reuse.

Example 118 is a wireless communication method, comprising sending an advertisement message to advertise a wireless docking station, the advertisement message to comprise a persistent pairing setting for the wireless docking station, receiving a request to use the wireless docking station, determining, by a processor circuit, whether the request comprises a renewed usage request, and in response to a determination that the request comprises a renewed usage request, determining whether to generate authentication information for an authentication handshake based on the persistent pairing setting.

In Example 119, the persistent pairing setting of Example 118 may optionally indicate whether the wireless docking station allows authentication information reuse.

In Example 120, the wireless communication method of any of Examples 118 to 119 may optionally comprise generating authentication information for the authentication handshake in response to a determination that the persistent pairing setting indicates that the wireless docking station does not allow authentication information reuse.

In Example 121, the wireless communication method of Example 120 may optionally comprise performing the authentication handshake using the generated authentication information.

In Example 122, the generated authentication information of any of Examples 120 to 121 may optionally comprise a digital certificate.

In Example 123, the wireless communication method of any of Examples 120 to 122 may optionally comprise generating the authentication information using a Wi-Fi Protected Setup (WPS) process.

In Example 124, the wireless communication method of any of Examples 118 to 119 may optionally comprise performing the authentication handshake by reusing stored authentication information in response to a determination that the persistent pairing setting indicates that the wireless docking station allows authentication information reuse.

In Example 125, the authentication handshake of any of Examples 118 to 124 may optionally comprise a Wi-Fi Protected Access II (WPA2) 4-way handshake.

In Example 126, the wireless communication method of any of Examples 118 to 119 may optionally comprise generating authentication information for an initial authentication handshake in response to a determination that the request comprises an initial usage request.

In Example 127, the wireless communication method of Example 126 may optionally comprise performing the initial authentication handshake using the generated authentication information.

In Example 128, the wireless communication method of Example 127 may optionally comprise determining, based on the persistent pairing setting, whether to preserve the generated authentication information following the initial authentication handshake.

In Example 129, the wireless communication method of Example 128 may optionally comprise preserving the generated authentication information following the initial authentication handshake in response to a determination that the persistent pairing setting indicates that the wireless docking station allows authentication information reuse.

In Example 130, the wireless communication method of Example 128 may optionally comprise deleting the generated authentication information following the initial authentication handshake in response to a determination that the persistent pairing setting indicates that the wireless docking station does not allow authentication information reuse.

In Example 131, the advertisement message of any of Examples 118 to 130 may optionally comprise a probe request.

In Example 132, the advertisement message of any of Examples 118 to 130 may optionally comprise a probe response.

In Example 133, the advertisement message of any of Examples 118 to 132 may optionally comprise an auto-connect mode setting for the wireless docking station.

In Example 134, the auto-connect mode setting of Example 133 may optionally indicate whether automatic connection to the wireless docking station is permitted.

In Example 135, the advertisement message of any of Examples 133 to 134 may optionally comprise an auto-connect capability information element (IE), the auto-connect capability IE to identify the auto-connect mode setting and the persistent pairing setting.

In Example 136, the auto-connect capability IE of Example 135 may optionally comprise an element identifier (ID) field, the element ID field to comprise a value indicating that the auto-connect capability IE comprises an auto-connect capability IE.

In Example 137, the auto-connect capability IE of any of Examples 135 to 136 may optionally comprise an auto-connect capabilities field, the auto-connect capabilities field to comprise information identifying the auto-connect mode setting and the persistent pairing setting.

In Example 138, the auto-connect capability IE of Example 137 may optionally comprise a length field, the length field to comprise a value indicating a length of the auto-connect capabilities field.

In Example 139, the auto-connect capabilities field of any of Examples 137 to 138 may optionally comprise a value selected from among a plurality of defined values, each of the plurality of defined values to indicate a particular respective auto-connect mode setting and a particular respective persistent pairing setting.

In Example 140, the plurality of defined values of Example 139 may optionally include a defined value that indicates that automatic connection to the wireless docking station is not permitted and that the wireless docking station allows authentication information reuse.

In Example 141, the plurality of defined values of any of Examples 139 to 140 may optionally include a defined value that indicates that automatic connection to the wireless docking station is not permitted and that the wireless docking station does not allow authentication information reuse.

In Example 142, the plurality of defined values of any of Examples 139 to 141 may optionally include a defined value that indicates that automatic connection to the wireless docking station is permitted and that the wireless docking station allows authentication information reuse.

Example 143 is at least one non-transitory computer-readable storage medium, comprising a set of instructions that, in response to being executed on a computing device, cause the computing device to perform a wireless communication method according to any of Examples 118 to 142.

Example 144 is an apparatus, comprising means for performing a wireless communication method according to any of Examples 118 to 142.

Example 145 is a system, comprising an apparatus according to Example 144, a radio frequency (RF) transceiver, and one or more RF antennas.

Example 146 is a wireless communication method, comprising discovering a wireless docking station based on a received advertisement message, the advertisement message to comprise an auto-connect mode setting, determining, by a processor circuit, whether the wireless docking station comprises a familiar wireless docking station, and in response to a determination that the wireless docking station comprises a familiar wireless docking station, determining whether to automatically initiate a connection procedure to establish a connection to the wireless docking station based on the auto-connect mode setting.

In Example 147, the auto-connect mode setting of Example 146 may optionally indicate whether automatic connection to the wireless docking station is permitted.

In Example 148, the wireless communication method of any of Examples 146 to 147 may optionally comprise automatically initiating the connection procedure in response to a determination that the auto-connect mode setting indicates that automatic connection to the wireless docking station is permitted.

In Example 149, the wireless communication method of any of Examples 146 to 147 may optionally comprise generating a connection prompt in response to a determination that the auto-connect mode setting indicates that automatic connection to the wireless docking station is not permitted.

In Example 150, the wireless communication method of Example 149 may optionally comprise receiving a connection decision in response to the connection prompt, and in response to a determination that the connection decision indicates that a connection to the wireless docking station is desired, initiating the connection procedure.

In Example 151, the connection decision of Example 150 may optionally comprise user input.

In Example 152, the advertisement message of any of Examples 146 to 151 may optionally comprise a probe request.

In Example 153, the advertisement message of any of Examples 146 to 151 may optionally comprise a probe response.

In Example 154, the advertisement message of any of Examples 146 to 153 may optionally comprise a persistent pairing setting.

In Example 155, the persistent pairing setting of Example 154 may optionally indicate whether the wireless docking station allows authentication information reuse.

In Example 156, the connection procedure of any of Examples 154 to 155 may optionally comprise an authentication handshake.

In Example 157, the authentication handshake of Example 156 may optionally comprise a Wi-Fi Protected Access II (WPA2) 4-way handshake.

In Example 158, the wireless communication method of any of Examples 154 to 157 may optionally comprise determining whether to generate authentication information for an initiated connection procedure based on the persistent pairing setting.

In Example 159, the wireless communication method of Example 158 may optionally comprise generating authentication information for the initiated connection procedure in response to a determination that the persistent pairing setting indicates that the wireless docking station does not allow authentication information reuse.

In Example 160, the wireless communication method of Example 159 may optionally comprise performing an authentication handshake using the generated authentication information.

In Example 161, the generated authentication information of any of Examples 159 to 160 may optionally comprise a digital certificate.

In Example 162, the wireless communication method of any of Examples 159 to 161 may optionally comprise generating the authentication information using a Wi-Fi Protected Setup (WPS) process.

In Example 163, the wireless communication method of Example 158 may optionally comprise performing an authentication handshake by reusing stored authentication information in response to a determination that the persistent pairing setting indicates that the wireless docking station allows authentication information reuse.

In Example 164, the advertisement message of any of Examples 154 to 163 may optionally comprise an auto-connect capability information element (IE), the auto-connect capability IE to identify the auto-connect mode setting and the persistent pairing setting.

In Example 165, the auto-connect capability IE of Example 164 may optionally comprise an element identifier (ID) field, the element ID field to comprise a value indicating that the auto-connect capability IE comprises an auto-connect capability IE.

In Example 166, the auto-connect capability IE of any of Examples 164 to 165 may optionally comprise an auto-connect capabilities field, the auto-connect capabilities field to comprise information identifying the auto-connect mode setting and the persistent pairing setting.

In Example 167, the auto-connect capability IE of Example 166 may optionally comprise a length field, the length field to comprise a value indicating a length of the auto-connect capabilities field.

In Example 168, the auto-connect capabilities field of any of Examples 166 to 167 may optionally comprise a value comprised among a plurality of defined values, each of the plurality of defined values to indicate a particular respective auto-connect mode setting and a particular respective persistent pairing setting.

In Example 169, the plurality of defined values of Example 168 may optionally include a defined value that indicates that automatic connection to the wireless docking station is not permitted and that the wireless docking station allows authentication information reuse.

In Example 170, the plurality of defined values of any of Examples 168 to 169 may optionally include a defined value that indicates that automatic connection to the wireless docking station is not permitted and that the wireless docking station does not allow authentication information reuse.

In Example 171, the plurality of defined values of any of Examples 168 to 170 may optionally include a defined value that indicates that automatic connection to the wireless docking station is permitted and that the wireless docking station allows authentication information reuse.

In Example 172, the wireless communication method of Example 154 may optionally comprise generating a connection prompt in response to a determination that the wireless docking station does not comprise a familiar wireless docking station.

In Example 173, the wireless communication method of Example 172 may optionally comprise receiving a connection decision in response to the connection prompt and, in response to a determination that the connection decision indicates that a connection to the wireless docking station is desired, generating authentication information for an initial authentication handshake.

In Example 174, the wireless communication method of Example 173 may optionally comprise performing the initial authentication handshake using the generated authentication information.

In Example 175, the wireless communication method of Example 174 may optionally comprise determining, based on the persistent pairing setting, whether to preserve the generated authentication information following the initial authentication handshake.

In Example 176, the wireless communication method of Example 175 may optionally comprise preserving the generated authentication information following the initial authentication handshake in response to a determination that the persistent pairing setting indicates that the wireless docking station allows authentication information reuse.

In Example 177, the wireless communication method of Example 175 may optionally comprise deleting the generated authentication information following the initial authentication handshake in response to a determination that the persistent pairing setting indicates that the wireless docking station does not allow authentication information reuse.

Example 178 is at least one non-transitory computer-readable storage medium, comprising a set of instructions that, in response to being executed on a computing device, cause the computing device to perform a wireless communication method according to any of Examples 146 to 177.

Example 179 is an apparatus, comprising means for performing a wireless communication method according to any of Examples 146 to 177.

Example 180 is a system, comprising an apparatus according to Example 179, a radio frequency (RF) transceiver, and one or more RF antennas.

In Example 181, the system of Example 180 may optionally comprise a display.

Example 182 is at least one non-transitory computer-readable storage medium comprising a set of wireless communication instructions that, in response to being executed on a computing device, cause the computing device to discover an unfamiliar wireless docking station based on a received advertisement message comprising a persistent pairing setting, the persistent pairing setting to indicate whether the unfamiliar wireless docking station allows authentication information reuse, generate authentication information, perform an authentication handshake using the generated authentication information, and determine, based on the persistent pairing setting, whether to preserve the generated authentication information following the authentication handshake.

In Example 183, the at least one non-transitory computer-readable storage medium of Example 182 may optionally comprise wireless communication instructions that, in response to being executed on the computing device, cause the computing device to preserve the generated authentication information following the authentication handshake in response to a determination that the persistent pairing setting indicates that the unfamiliar wireless docking station allows authentication information reuse.

In Example 184, the at least one non-transitory computer-readable storage medium of Example 182 may optionally comprise wireless communication instructions that, in response to being executed on the computing device, cause the computing device to delete the generated authentication information following the authentication handshake in response to a determination that the persistent pairing setting indicates that the unfamiliar wireless docking station does not allow authentication information reuse.

In Example 185, the authentication information of any of Examples 182 to 184 may optionally comprise a digital certificate.

In Example 186, the received advertisement message of any of Examples 182 to 185 may optionally comprise an auto-connect mode setting to indicate whether automatic connection to the unfamiliar wireless docking station is permitted.

In Example 187, the at least one non-transitory computer-readable storage medium of any of Examples 182 to 186 may optionally comprise wireless communication instructions that, in response to being executed on the computing device, cause the computing device to initiate a connection procedure in response to received user input, and perform the authentication handshake during the connection procedure.

In Example 188, the authentication handshake of any of Examples 182 to 187 may optionally comprise a Wi-Fi Protected Access II (WPA2) 4-way handshake.

In Example 189, the received advertisement message of any of Examples 182 to 188 may optionally comprise an auto-connect capability information element (IE), the auto-connect capability IE to identify the auto-connect mode setting and the persistent pairing setting.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   logic, at least a portion of which is implemented in circuitry of a mobile client, the circuitry coupled to the memory, the logic to:
      detect a wireless docking station based on a received message, the message comprising information including an indication that automatic connection to the wireless docking station is prohibited; and
      determine not to automatically connect to the wireless docking station based on the indication that automatic connection to the wireless docking station is prohibited.

2. The apparatus of claim 1, the logic to generate a connection prompt in response to the determination not to automatically connect to the wireless docking station.

3. The apparatus of claim 1, the logic to determine to connect to the wireless docking station in response to a manual selection of the wireless docking station for use.

4. The apparatus of claim 3, the logic to reuse stored authentication information during an exchange of authentication information with the wireless docking station.

5. The apparatus of claim 1, the message to be received during a discovery phase of a connection procedure.

6. The apparatus of claim 1, the message to be received in accordance with an Institute of Electrical and Electronics Engineers (IEEE) 802.11ad-2012 standard.

7. The apparatus of claim 1, the message to comprise a probe request or probe response.

8. The apparatus of claim 1, the message to comprise an advertising message.

9. The apparatus of claim 1, the message to comprise configuration information identifying one or more settings of the wireless docking station, the one or more settings to include an auto-connect setting comprising the indication that automatic connection to the wireless docking station is prohibited.

10. The apparatus of claim 1, the message to be received via a wireless personal area network (WPAN).

11. The apparatus of claim 1, the logic to determine, based on the indication that automatic connection to the wireless docking station is prohibited, that a procedure for establishing a connection to the wireless docking station may be initiated only in response to user input comprising a manual selection of the wireless docking station.

12. The apparatus of claim 1, the logic to implement a management component to manage wireless connections of the mobile client, the management component to perform the determination not to automatically connect to the wireless docking station based on the indication that automatic connection to the wireless docking station is prohibited.

13. The apparatus of claim 1, comprising:
   a radio interface coupled to the circuitry, the radio interface to receive the message.

14. An apparatus, comprising:
   a memory; and
   circuitry coupled to the memory, the circuitry to generate a message for transmission from a wireless docking station to enable one or more mobile clients to detect the wireless docking station, the message to comprise information indicating that automatic connection to the wireless docking station is prohibited.

15. The apparatus of claim 14, the circuitry to generate the message for transmission from the wireless docking station during a discovery phase of a connection procedure.

16. The apparatus of claim 14, the circuitry to generate the message for transmission in accordance with an Institute of Electrical and Electronics Engineers (IEEE) 802.11ad-2012 standard.

17. The apparatus of claim 14, the message to comprise an information element (IE) containing the information indicating that automatic connection to the wireless docking station is prohibited.

18. The apparatus of claim 14, the circuitry to generate the message for transmission via a wireless personal area network (WPAN).

19. The apparatus of claim 14, the message to comprise a probe request or probe response.

20. The apparatus of claim 14, the circuitry to:
   identify a usage request received from a mobile client, the usage request to comprise a request to use the wireless docking station; and
   reuse stored authentication information during an exchange of authentication information with the mobile client.

21. The apparatus of claim 14, the message to comprise an advertising message.

22. The apparatus of claim 14, the message to comprise configuration information identifying one or more settings of the wireless docking station.

23. The apparatus of claim 22, the one or more settings to include an auto-connect setting indicating that automatic connection to the wireless docking station is prohibited.

24. The apparatus of claim 14, comprising:
   a radio transmitter coupled to the circuitry, the radio transmitter to transmit the message.

25. At least one non-transitory computer-readable storage medium, comprising a set of instructions that, in response to being executed on a computing device, cause the computing device to:
   generate a message for transmission from a wireless docking station during a discovery phase of a connection procedure to enable one or more mobile clients to detect the wireless docking station, the message to comprise information including an indication that automatic connection to the wireless docking station is prohibited.

26. The at least one non-transitory computer-readable storage medium of claim 25, comprising instructions that, in response to being executed on the computing device, cause the computing device to generate the message for transmission in accordance with an Institute of Electrical and Electronics Engineers (IEEE) 802.11ad-2012standard.

27. The at least one non-transitory computer-readable storage medium of claim 25, the indication to be comprised in an information element (IE) comprised in the message.

28. The at least one non-transitory computer-readable storage medium of claim 25, the message to comprise a probe request or probe response.

29. The at least one non-transitory computer-readable storage medium of claim 25, comprising instructions that, in response to being executed on the computing device, cause the computing device to:
   identify a usage request received from a mobile client, the usage request to comprise a request to use the wireless docking station; and reuse stored authentication information during an exchange of authentication information with the mobile client.

30. The at least one non-transitory computer-readable storage medium of claim 25, the message to comprise an advertising message.

31. The at least one non-transitory computer-readable storage medium of claim 25, the message to comprise configuration information identifying one or more settings of the wireless docking station.

32. The at least one non-transitory computer-readable storage medium of claim 31, the one or more settings to include an auto-connect setting comprising the indication that automatic connection to the wireless docking station is prohibited.

33. The at least one non-transitory computer-readable storage medium of claim 25, comprising instructions that, in response to being executed on the computing device, cause the computing device to generate the message for transmission via a wireless personal area network (WPAN).

34. At least one non-transitory computer-readable storage medium, comprising a set of instructions that, in response to being executed at a mobile client, cause the mobile client to:
    detect a wireless docking station based on a message received during a discovery phase of a connection procedure, the message to comprise information including an indication that automatic connection to the wireless docking station is prohibited; and
    determine not to automatically connect to the wireless docking station based on the indication that automatic connection to the wireless docking station is prohibited.

35. The at least one non-transitory computer-readable storage medium of claim 34, comprising instructions that, in response to being executed at the mobile client, cause the mobile client to generate a connection prompt in response to the determination not to automatically connect to the wireless docking station.

36. The at least one non-transitory computer-readable storage medium of claim 34, comprising instructions that, in response to being executed at the mobile client, cause the mobile client to determine to connect to the wireless docking station in response to a manual selection of the wireless docking station for use.

37. The at least one non-transitory computer-readable storage medium of claim 36, comprising instructions that, in response to being executed at the mobile client, cause the mobile client to reuse stored authentication information during an exchange of authentication information with the wireless docking station.

38. The at least one non-transitory computer-readable storage medium of claim 34, the message to be received in accordance with an Institute of Electrical and Electronics Engineers (IEEE) 802.11ad-2012 standard.

39. The at least one non-transitory computer-readable storage medium of claim 34, the message to comprise a probe request or probe response.

40. The at least one non-transitory computer-readable storage medium of claim 34, the message to comprise an advertising message.

41. The at least one non-transitory computer-readable storage medium of claim 34, the message to comprise configuration information identifying one or more settings of the wireless docking station, the one or more settings to include an auto-connect setting comprising the indication that automatic connection to the wireless docking station is prohibited.

42. The at least one non-transitory computer-readable storage medium of claim 34, the message to be received via a wireless personal area network (WPAN).

43. The at least one non-transitory computer-readable storage medium of claim 34, comprising instructions that, in response to being executed at the mobile client, cause the mobile client to determine, based on the indication that automatic connection to the wireless docking station is prohibited, that a procedure for establishing a connection to the wireless docking station may be initiated only in response to user input comprising a manual selection of the wireless docking station.

44. The at least one non-transitory computer-readable storage medium of claim 34, comprising instructions that, in response to being executed at the mobile client, cause the mobile client to implement a management component to manage wireless connections of the mobile client, the management component to perform the determination not to automatically connect to the wireless docking station based on the indication that automatic connection to the wireless docking station is prohibited.

* * * * *